(12) United States Patent
Massonnat et al.

(10) Patent No.: US 12,535,618 B2
(45) Date of Patent: Jan. 27, 2026

(54) METHOD FOR MODELLING THE FORMATION OF A SEDIMENTARY AREA BY SIMULATING TIDAL CURRENT-INDUCED PARTICLE TRANSPORT

(71) Applicant: TotalEnergies OneTech, Courbevoie (FR)

(72) Inventors: Gérard Massonnat, Pau (FR); Charles Danquigny, Pau (FR)

(73) Assignee: TotalEnergies OneTech, Courbevoie (FR)

( * ) Notice: Subject to any disclaimer, the term of this patent is extended or adjusted under 35 U.S.C. 154(b) by 1115 days.

(21) Appl. No.: 17/610,071

(22) PCT Filed: May 10, 2019

(86) PCT No.: PCT/IB2019/000591
§ 371 (c)(1),
(2) Date: Nov. 9, 2021

(87) PCT Pub. No.: WO2020/229866
PCT Pub. Date: Nov. 19, 2020

(65) Prior Publication Data
US 2022/0252758 A1  Aug. 11, 2022

(51) Int. Cl.
*G01V 20/00* (2024.01)
(52) U.S. Cl.
CPC .................. *G01V 20/00* (2024.01)
(58) Field of Classification Search
CPC ............. G01V 20/00; G01V 2210/661; G01V 2210/665
See application file for complete search history.

(56) References Cited

U.S. PATENT DOCUMENTS

2013/0132047 A1  5/2013  Granjeon
2016/0070829 A1*  3/2016  Sun .................. G01V 20/00
703/2

OTHER PUBLICATIONS

Young-Hoon Lee et al.; "Stanford's SEDSIM project: dynamic three-dimensional simulation of geologic processes that affect clastic sediments"; Computer Graphics in Geology: Three-Dimensional Computer Graphics in Modeling 2007 (Year: 2007).*

(Continued)

*Primary Examiner* — Rehana Perveen
*Assistant Examiner* — Nupur Debnath
(74) *Attorney, Agent, or Firm* — Seed Intellectual Property Law Group LLP

(57) ABSTRACT

A method for simulating the evolution of a geological gridded model of an area comprising a plurality of cells, over a predetermined period of time T, comprising: a) assigning a water depth to each cell, b) determining, for each cell, a direction and velocity of a water current, c) introducing a number of particles in the model, d) transporting each particle based on the direction and velocity of the current, and e) updating the model according to the transport of each particle, wherein the current is a tidal current, comprising alternate phases of rising tide current and falling tide current, simulating the evolution of the model over the period of time T comprises iterating steps a. to e. a number of times equal to 2k, each iteration of steps a. to e. corresponds to simulating the evolution of the model over a period of time T/2k, each iteration of step b. is performed the rising tide or falling tide current, and two successive iterations of step b. are performed for each one of the rising tide current and falling tide current.

11 Claims, 17 Drawing Sheets

(56) References Cited

OTHER PUBLICATIONS

Fagherazzi et al., "Dynamics of river mouth deposits," *AGU Publications—Reviews of Geophysics*, Review Article, 10.1002/2014RG000451, 2015, pp. 642-672.

Fan et al., "River flooding, storm resuspension, and event stratigraphy on the northern California shelf: observations compared with simulations," *Marine Geology* 210:17-41, 2004.

Herrera-Díaz et al., "Light Particle Tracking Model for Simulating Bed Sediment Transport Load in River Areas," *Hindawi—Mathematical Problems in Engineering*, vol. 2017, Article ID 1679257, 16 pages.

Lane, "Development of a Lagrangian sediment model to reproduce the bathymetric evolution of the Mersey Estuary," *Ocean Dynamics* 55:541-548, 2005.

Suh, "A hybrid approach to particle tracking and Eulerian-Lagrangian models in the simulation of coastal dispersion," *Environmental Modelling & Software* 21:234-242, 2006.

* cited by examiner

METHOD FOR MODELLING THE FORMATION OF A SEDIMENTARY AREA BY SIMULATING TIDAL CURRENT-INDUCED PARTICLE TRANSPORT

TECHNICAL FIELD

The invention relates to a computer implemented method for modelling the formation of sedimentary areas, and in particular for modelling the formation of oil or gas reservoirs.

TECHNICAL BACKGROUND

Forward stratigraphic modelling is already known for modelling the formation of sedimentary basins. In this type of modelling, an area is defined as a geological gridded model, and the modelling comprises superposing layers on the gridded model, each layer corresponding to a predetermined period of time and having a thickness which depends on an amount of material brought or created at a defined location during the period of time. Each layer can be called a "time-layer".

An example of forward stratigraphic modelling is for instance the DionisosFlow™ numerical stratigraphic model developed by IFP Energies Nouvelles, which allows reconstructing the stratigraphic architecture of sedimentary basins at a regional scale, by modelling basin deformation, clastic and carbonate supplies and sediment transport in continental and marine environment.

This model is used to simulate areas of regional scale, i.e. having dimensions of about 100×100 km², and on very long timescales. Each time layer simulated in this model is of at least 10000 years, up to 100000 years, in order to model phenomena occurring on durations of at least several millions of years, up to several tens of millions of years.

In order to be able to compute phenomena on such large geographical and time scales, the algorithms implemented by this model for simulating the transport of particles are only based on diffusion. This implies that the geological phenomena which are simulated in forward simulators like DionisosFlow™ are necessarily continuous and homogeneous, and hence this model cannot be used to model for instance the formation of an oil reservoir.

On the other hand, some models also exist to simulate phenomena which are more localized both in time and space, such as snow avalanches, etc. These models are based on equations modelling the motion of fluids such as Navier-Stokes equations.

These models require a high computational load as compared to the time scale of the modelled phenomena, since the modelling of a phenomena requires a computational time of 1.5 times the duration of the modelled phenomena. Hence these times of models are not suitable for modelling the formation of reservoirs.

There is therefore a need for a forward stratigraphic modelling method which is more appropriate for the simulation of the formation of oil or gas reservoirs.

SUMMARY OF THE INVENTION

In view of the above, an aim of the invention is to provide a method for modelling the formation of sedimentary areas taking into account other phenomena responsible for particle transports than diffusion.

In particular, the invention aims at taking into account the influence of marine currents on the transport of particles.

Accordingly, a computer-implemented method for modelling the formation of a sedimentary area is disclosed, the method comprising simulating the evolution of a geological gridded model of the area, comprising a plurality of cells, over a predetermined period of time T, said simulation comprising steps of:
  a. assigning a water depth to each cell of the geological gridded model,
  b. determining, for each cell of the geological gridded model, a direction and velocity of a water current,
  c. introducing a number of particles in the geological gridded model,
  d. transporting each introduced particle in the geological gridded model based on the computed direction and velocity of the water current, and
  e. updating the geological gridded model of the area according to the transport of each introduced particle,
wherein the water current is a tidal current, comprising alternate phases of rising tide current and falling tide current, and the simulation of the evolution of the geological gridded model over the predetermined period of time T comprises iterating steps a. to e. a number of times equal to 2k where k is an integer superior or equal to 1, where each iteration of steps a. to e. corresponds to simulating the evolution of the geological gridded model over a period of time T/2k,
each iteration of step b. is performed for one of the rising tide current or falling tide current, and two successive iterations of step b. are performed respectively for one and the other of the rising tide current and falling tide current.

In embodiments, for each cell, the direction of the rising tide current is opposite the direction of the falling tide current, and the energy of the rising tide current is equal to the energy of the falling tide current.

In embodiments, the water depth assigned to each cell is determined based on a reference water level, and determining the direction of the tidal current comprises:
  determining a high tide water level from the reference water level and a tidal range,
  determining a high tide shoreline from the determined high tide water level, and
  setting, in each cell, the direction of the rising tide current and the falling tide current, according to the localization of the cell relative to the high tide shoreline, wherein the direction of the rising tide current is perpendicular and towards the shoreline, and the direction of the falling tide current is perpendicular and away from the shoreline.

In embodiments, the tidal current is decomposed into a plurality of sub-currents comprising at least:
  a plume current, located at water surface, and
  a bottom current, located at water bottom,
and determining the velocity of the tidal current comprises determining a velocity of each sub-current into which the current is decomposed.

Determining, for each cell, the velocity of the tidal current may then comprise computing the energy of the plume current and inferring, from the energy of the plume current in the cell, the energy in the cell of all other sub-currents into which the current is decomposed.

The water depth assigned to each cell may be determined based on a reference water level, and determining the velocity of the tidal current comprises:
  determining a high tide water level from the reference water level and a tidal range, and a water depth of tidal current limit of influence (from the tidal range, determining a high tide shoreline from the determined high tide water level, and computing an energy of the tidal plume current at the cell, the energy of the tidal plume current being a function of the distance of the cell relative to the high tide shoreline, such that the tidal plume current energy increases from zero at the high tide shoreline to its maximum value at a distance from the shore corresponding to a cell height equal to the reference water level, and decreasing from this distance until reaching zero at a distance from the shore corresponding to a water depth, relative to the high tide water level, equal to the water depth of tidal current limit of influence.

In embodiments, the method further comprises inferring an energy of the tidal bottom current at the cell from the energy of the tidal plume current at the cell, the energy of the tidal bottom current being a function of the water depth of the cell, relative to the high tide water level, such that the bottom current energy is equal to the plume current energy at a water depth of zero, and decreases until reaching a value of zero for a water depth of at least the water depth of tidal current limit of influence.

According to another aspect, a computer program product is disclosed, comprising code instructions for implementing the method according to the above disclosure, when it is executed by a processor.

According to another aspect, a non-transitory computer readable storage medium is disclosed, having stored thereon a computer program comprising program instructions, the computer program being loadable into a processor and adapted to cause the processor to carry out, when the computer program is run by the processor, the method according to the above disclosure.

According to another aspect, a device for modelling the formation of a sedimentary area, the device comprising a processor configured to implement the method according to the above disclosure.

BRIEF DESCRIPTION OF THE DRAWINGS

The present invention is illustrated by way of example, and not by way of limitation, in the figures of the accompanying drawings, in which like reference numerals refer to similar elements and in which:

FIG. 2b is a flow chart describing another possible embodiment of the method of FIG. 2a.

DESCRIPTION OF PREFERRED EMBODIMENTS OF THE INVENTION

The method described below models the formation of sedimentary areas by simulating the deposition over time of clastic and/or carbonates supplied by diverse supply processes such as rivers, travertine sources, or in-situ production of carbonates. This method also takes into account the impact of water currents on the transport of clastic and carbonates particles. The area to be modelled can be either a marine or oceanic area, or a lake area.

Figure 1:
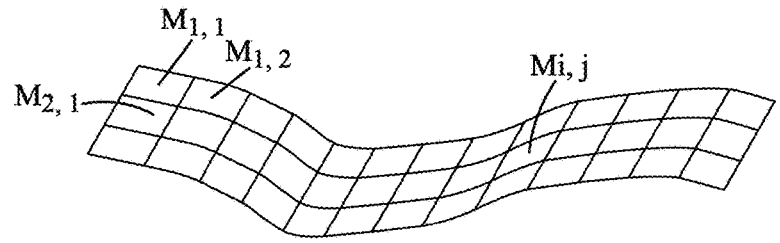
FIG. 1 is an example of a geological gridded model of an area.

The method is a forward stratigraphic modelling method, wherein an area to be modelled is represented by a geological layer gridded model, an example of which is shown in FIG. 1, and which can be two-dimensional, for example as represented in FIG. 1 for the sake of clarity, or, preferably, three-dimensional. The layer gridded model of FIG. 1 comprises grid cells $M_{1,1}$, $M_{1,2}$, $M_{2,1}$, ..., and more generally $M_{i,j}$, where the variables i and j indicate the spatial positions of the cells.

Typically, each cell represents an area having a side length of a few hundreds of meters, up to a few kilometers. The method comprises iterating a series of steps modelling the introduction into the models of clastic and/or carbonates particles during a predetermined period of time T, their transport by water currents during this period of time T, and the deposition of some of these particles to form layers of sediments.

At the end of this period of time, the topography of the model is updated in each cell according to the quantity of deposited particles. More specifically, a layer is generated, which thickness in each cell is determined based on a number of particles deposited at this cell. Such a layer is called a time layer since it corresponds to the passage of the predetermined period of time T. The topography of the geological gridded model of the area thus evolves with the accumulation of time layers.

Moreover, as the sedimentary area to be simulated by the method is typically a marine area, a water level is also parameterized, which can vary after each iteration of the method, i.e. after each predetermined period of time T.

Figure 2A:
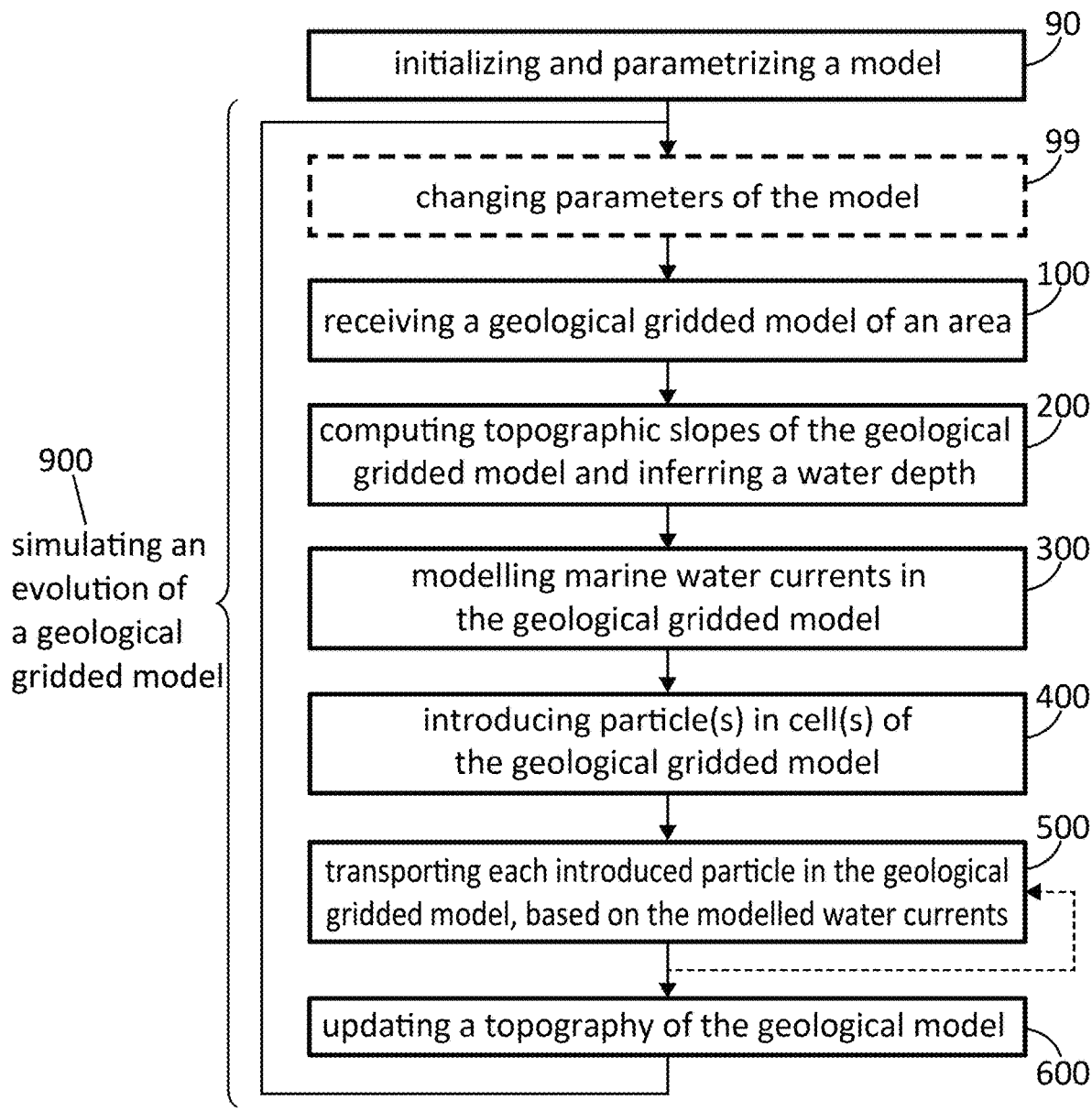
FIG. 2a is a flow chart describing a possible embodiment of the method for modelling the formation of a sedimentary area.

A flow chart describing the main steps of an iteration of the method is shown in FIG. 2a. This method is implemented by a computer, details of which are given below.

Setup Step

The method comprises a first preliminary setup step 90.

This setup step comprises initializing the topography of the modelled area, by attributing to each cell a position (x,y) and assigning a parameter $z_0$ which is the height of the surface of the ground.

The setup step 90 also includes the parameterizing of the model by a user, including specifying the number and types of particle supply processes, and the number and types of marine currents to be modelled.

Regarding the supply processes, the user may select the type of supply processes to be modelled among rivers, travertine sources, volcanoes, in-situ production of carbonates, and remobilization of travertine or carbonates (for instance if a piece of travertine is broken by a current, it can be transported and deposited again). The user may also select the location, in the geological gridded model, of the sources.

The setup step also comprises, for each supply process selected by the user, the definition of a supply model, which comprises a supply rate expressed as a thickness of element produced or transported, according to the type of supply process, (for instance in meters) per time layer, the definition and repartition of the elements supplied by the supply process. The definition of each supply model may be set by a user.

During the subsequent modelling of a supply process, the supplied elements are introduced in the models as particles (step 400 described below), where each particle represents a determined mass or volume of clastic or carbonates sediments of a defined granulometric class.

The definition of each supply model thus also comprises the definition of a distribution of granulometric classes of particles, and the number of particles of each granulometric class introduced per cell during a time layer T, which is derived from the distribution of granulometric classes and the supply rate.

Regarding the currents to be modelled, the user may choose to model at least one of the following water currents:
River-mouth induced current,
Wind-induced current,
Tidal current, and
Oceanic current.

Additionally, the setup step 90 comprises setting an initial reference water level $z_r$, as well as the evolution of the reference water level over the model between two successive periods of time T, i.e. two successive time layers (eustatism for marine areas), and the amount of subsidence of the ground's surface over the geological gridded model between two time layers. The amount of subsidence may vary over the model of the area, i.e. it may not be the same for all the cells of the model.

From the initial topography of the geological gridded model and the initial reference water level, a water depth WD in each cell is inferred and assigned to the respective cell. If a cell is above the reference water level, then the assigned water depth is zero.

If at least one river mouth induced current is to be modelled, the setup step 90 can comprise the user setting the volumetric flow of the river at the river mouth, the width of the river mouth and the water height at the river mouth.

Figure 3A:
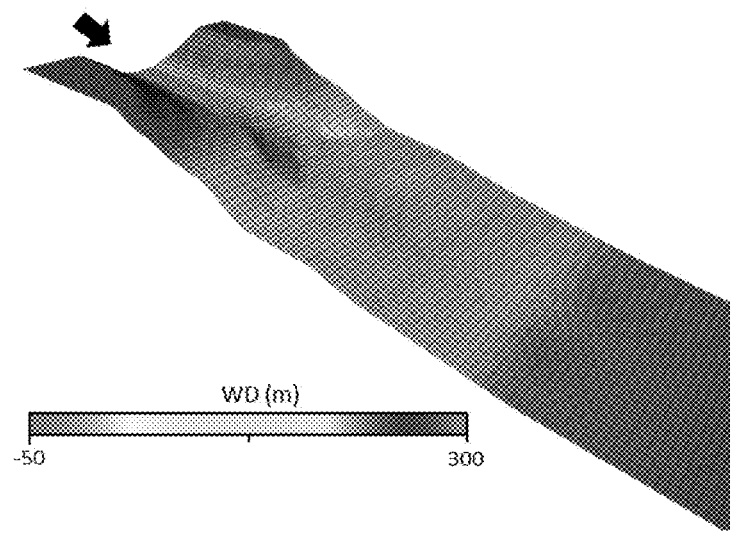
FIGS. 3a and 3b illustrate a cell fill of a gridded geological model according to a possible embodiment of the method for modelling the formation of a sedimentary area.

With reference to FIG. 3a is shown an example of the geological gridded model according to an initial topography. This model comprises a plurality of cells having different water depths. The water level is not shown on this figure. A river mouth is represented with a river represented by an arrow, and the current induced by the river is modelled.

The method then comprises a series of steps which are detailed below, and which are implemented to generate one time layer, representing the passage of the predetermined period of time T.

However, in embodiments, it may be necessary to take into account shorter times than the period of time T to exactly simulate some phenomena. In that cases, the simulation of the period of time T and the generation of the time layer corresponding to this period of time is subdivided into a plurality of shorter periods of time, such that the overall duration of the shorter periods corresponds to T, and the setup step 90 further comprises determining the number N of shorter periods of time into which the period T has to be subdivided.

The generation of a time layer corresponding to the period T then involves iterating the series of steps said number N of times, where each iteration allows generating a sub-time layer, called a computation layer, representing a subperiod of time.

The embodiments where it is necessary to subdivide the period T in a plurality of computation layers are:
If the supply processes to be modelled comprise production of carbonates, and/or,
If the currents to be modelled comprise tidal current.

Indeed, the production of carbonates depends on the water level in each cell. For a given cell of the model where production of carbonates should occur, it is necessary that the ground surface be below the water level in order for the carbonates to be produced.

Therefore in some cases the variation of the water level in a cell during the period of time T may imply that the considered cell is above water level and then the production of carbonates according to the production model is prevented.

If production of carbonates is selected as one supply process, the setup step 90 comprises determining the number N of subperiods of time as follows.

The maximum variation of water level (also called accommodation) per time layer over the geological model is computed, the variation of water level in each cell being inferred from the variation of the reference water level $z_r$ over the period of time and the subsidence variation in the cell. This maximum variation is then divided by 1 meter to obtain the minimum number of iterations of the series of steps to represent the period of time T. The number N of subdivisions of the period of time T, i.e. the number of computation layers needed to implement one time layer, is then preferably equal to this minimum number.

Regarding tidal current, a particularity of tidal current is that it occurs four times a day in two different directions, as there are two rising tides and two falling tides per day, and that the effects of a rising tide do not compensate for the effects of a falling tide. Hence modelling tidal current requires modelling both rising tide currents and falling tides current.

Therefore, if tide current is simulated, a more accurate representation of its effects implies iterating the series of steps an even number of times, such that half of the iterations are performed to simulate the rising tide and the other half is performed to simulate the falling tide, with each iteration simulating the rising tide being followed by an iteration to simulate the falling tide.

Thus, if tidal current is selected as one current to be modelled, the setup step comprises setting the number N of subperiods of time as an even number, for instance 2 or 4.

Preferably, if tidal currents and production of carbonates are simulated, the number N of computation layer determined to simulate one time layer for the period T is preferably equal to the minimum number determined with regard to the production of carbonates, if this number is even, or to this minimum +1 if this number is uneven.

Computation Layer

The series of steps which forms one computation layer, and which is implemented at least once to generate a time layer, or iterated a number N of times in the embodiments described above, is designated by reference 900 on FIGS. 2*a* and 2*b*, and will now be described.

An optional preliminary step 99 comprises the change of some parameters of the model by the user, if it is desired to represent an evolution of these parameters between one period of time represented by a time layer T and another. For instance, the parameters regarding the river mouth current that can be set at step 90 (volumetric flow, width and height at the river mouth) can be modified at step 99. Also, the definition of each supply process may be changed at optional step 99.

The amount of eustatism and subsidence may also be amended between two time layers during said preliminary step 99.

A step 100 comprises receiving the geological gridded model of the area, either by loading an initial version of the model, or by updating the model according to a previous iteration of the series of steps. The update comprises updating a height along z of each cell, which corresponds to the initial position $z_0$ of the cell along z added to the thickness of particles deposited at the cell. The height along z may also take into account local subsidence of the ground's surface.

The method then comprises a step 200 of computing, from the topography received at step 100, topographic slopes of the geological model, and inferring, from the topography and the reference water level $z_r$, the water depth WD in each cell.

The method then comprises a step 300 of modelling marine water currents in the geological gridded model. This step is performed by determining, for each cell of the geological gridded model for which WD>0, a direction and velocity of each water current to be modelled. The shoreline SL is defined by cells for which WD=0 and which are adjacent cells for which WD>0.

If a plurality of water currents is modelled, a direction and velocity are determined for each individual water current, and step 300 also comprises computing the direction and velocity, in each cell, of a global water current resulting from the sum of all the individual water currents.

As disclosed in more details below, the determination of velocity of some individual water currents is based on computing an energy of the water current, which is a kinetic energy of the water current, and hence the velocity can be readily deduced from the kinetic energy and the volumetric mass of water, which can be either sea water or lake water.

Figure 4:
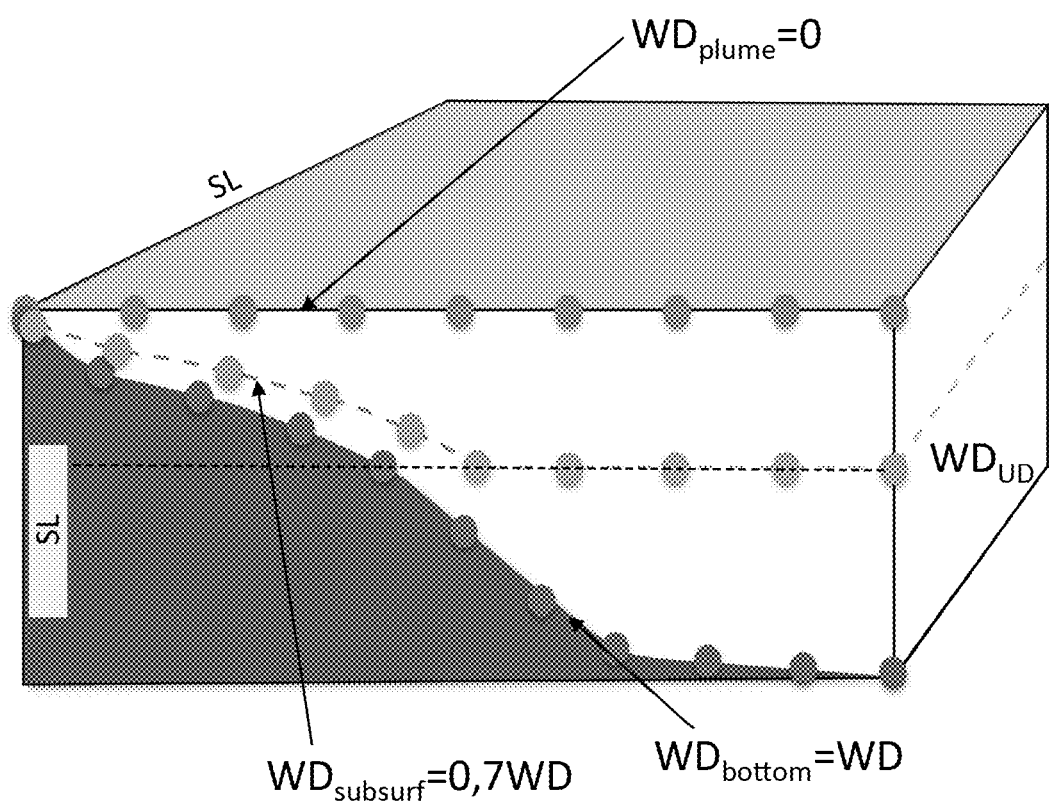
FIG. 4 represents the respective water depths of the subcurrents into which a water current is decomposed.

In addition, and with reference to FIG. 4, each water current is decomposed into at least a plume current, located at water surface, and a bottom current, located at water bottom. As will be seen in more details below, this decomposition allows taking into account the fact that each current may not be homogeneous along all the water depth of a cell, but is typically stronger at surface and weaker at the bottom.

Preferably, each water current is decomposed into a plume current, a bottom current, and at least one subsurface current, located at a determined depth between the water surface and the water bottom. Optionally, a plurality of subsurface currents may be modelled, each subsurface current corresponding to a respective depth between water surface and water bottom, in order to increase the precision of the model. According to an exemplary embodiment, each current may be decomposed into:

A plume current,
A subsurface current, and
A bottom current.

The bottom current applies only at water bottom, i.e. at a water depth $WD_{bottom}$ equal to the water depth assigned to the cell: WD.

The subsurface current applies for instance at a water depth $WD_{Subsurf}$ equal to a water depth equal to 0.5 or 0.7 WD, until it reaches a maximum water depth which can be defined by a user $WD_{UD}$.

The plume current applies only at a water depth $WD_{plume}=0$.

If the water current to be modelled is chosen among the group consisting of: wind-induced current, tidal current, and oceanic current, then:

determining the direction of a water current comprises determining a single direction, which is the same for the plume current, bottom current, and any subsurface current, and determining the energy of a water current in a cell comprises computing an energy of the plume current, and then inferring from the energy of the plume current the energy of the bottom current and any subsurface current.

The determination of a direction and energy of each water current among the group consisting of river-induced current, wind-induced current, tidal current and oceanic current, is disclosed below after the overall description of the steps forming one computation layer.

Referring once again to FIG. 2*a*, once water currents are modelled, and, for each cell, a direction and velocity of a global current resulting from all the modelled currents are obtained, the method comprises a step 400 of introducing at least one particle in at least one cell of the geological gridded model.

The number of particles introduced at step 400, and the granulometric class of each introduced particle, depend on the production model and the distribution of granulometric classes of the particles defined at the setup step 90, and optionally changed at step 99.

Moreover, if in step 90 a number N greater than 1 of computation layers had been determined in order to form one time layer corresponding to the period T, then the number of particles introduced at step 400 for each computation layer corresponds preferably to the total number of particles to be introduced in one time layer, divided by the number N of computation layers.

Each introduced particle may result from either a clastic supply process, or a carbonate supply process. Clastic supply processes comprise river mouth supply, volcanoes, mineral sources causing travertine deposition and remobilization of travertine deposition, while carbonate supply processes comprise in situ production of carbonates (due to the decomposition of organic material) or remobilization of produced carbonates.

Each particle is introduced at a determined depth, which determines the sub-current (plume, subsurface or bottom) applied to the particle, according to the supply process from which it originates and the granulometric class of the particle.

Accordingly, particles originating from:
mineral sources causing deposit of travertine,
remobilization of travertine;
in-situ production of carbonates, or
remobilization of carbonates
are introduced at the water bottom and, as explained in greater details below, are only exposed to bottom currents.

On the other hand, particles originating from a river mouth are introduced at a depth which is determined according to the type of sedimentary charge distribution of the river, among homopycnal, hyperpycnal and hypopycnal, as explained in more details below in the section relating to the modelling of the current induced by the river.

The method then comprises transporting 500 each introduced particle in the geological gridded model, based on the modelled water currents.

Figure 2B:
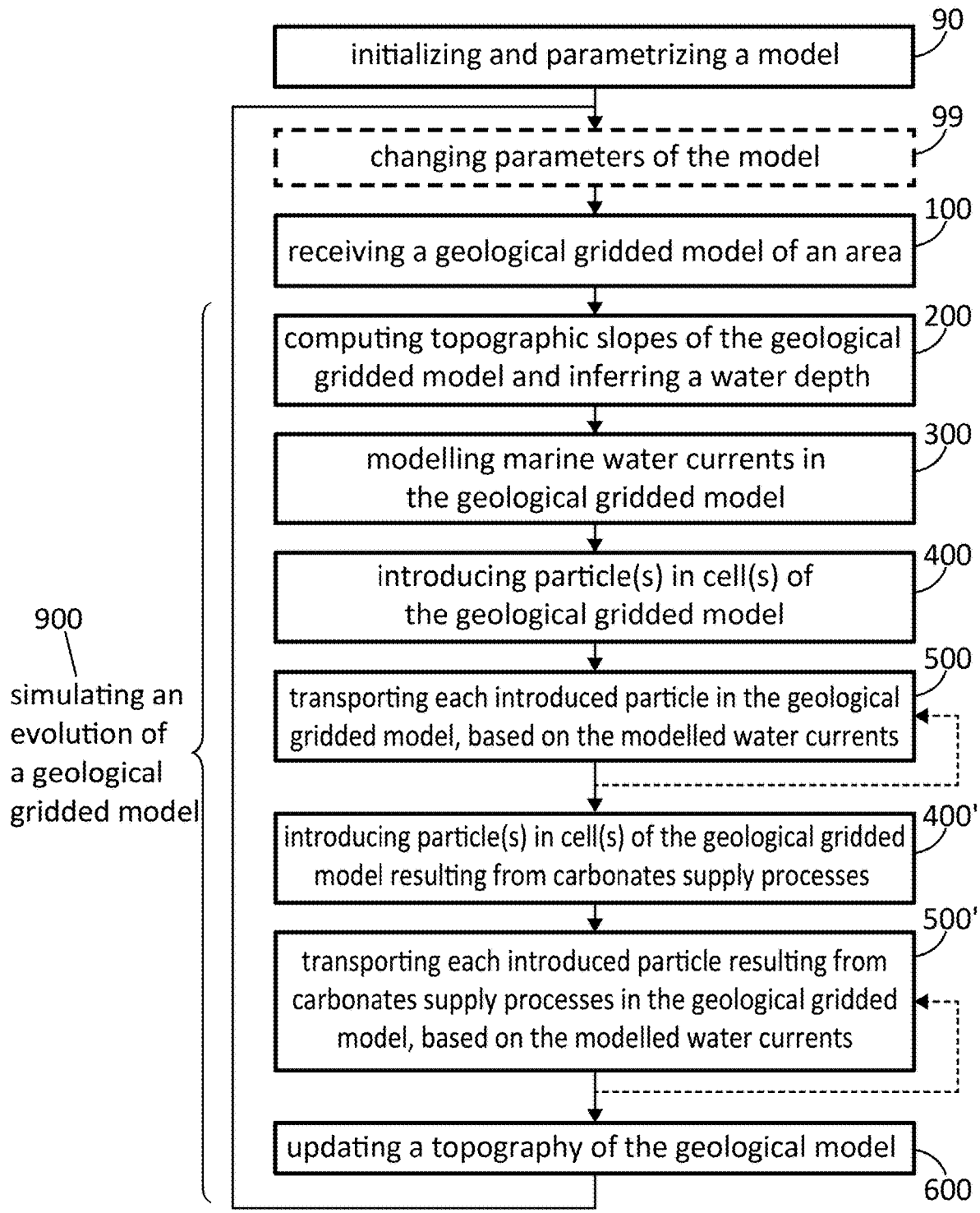

Preferably, and as shown schematically in FIG. 2b, if both clastic supply processes and carbonates supply processes are modelled, the method comprises implementing step 400 introducing only particles resulting from clastic supply processes, and transporting 500 said particles, and then implementing another step 400' for introducing particles resulting from carbonates supply processes, and transporting 500' said particles.

Indeed, it has been observed that clastic transport processes are an inhibiting factor of the production of carbonates, hence this successive implementation of steps 400 and 500 for clastic particles first and then carbonates allows a more realistic representation of the phenomena.

The transport of a particle is either the displacement of the particle from its current cell to a neighboring cell, or the deposition of the particle in the cell. For each particle, in each cell, the choice between displacement and deposition of the particle is done according to the type of particle, to its granulometric diameter, and according to the velocity of the resulting sub-current (plume, subsurface or bottom subcurrent) applied to the particle in the cell, the subcurrent applied to the particle depending on the depth at which the particle is introduced.

Figure 5A:
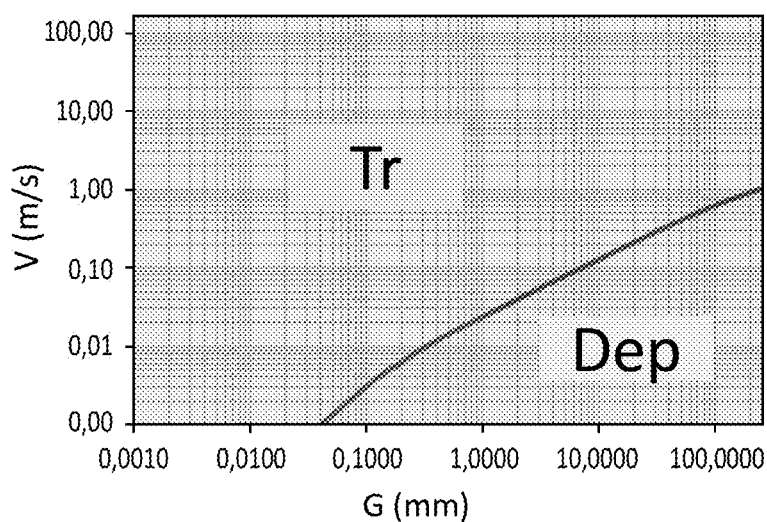
FIG. 5a represents a Hjulström diagram adapted to a marine area.

For instance, one may use a Hjulström diagram adapted to a marine area such as the one shown in FIG. 5a, or use various Hjulström diagrams according to the type of particle that is considered. Each Hjulström diagram indicates if the particle is transported (Transport domain Tr) or deposited (Deposition domain Dep) according to the velocity V of the current in the cell and according to the granulometric diameter G of the particle.

Figure 5B:
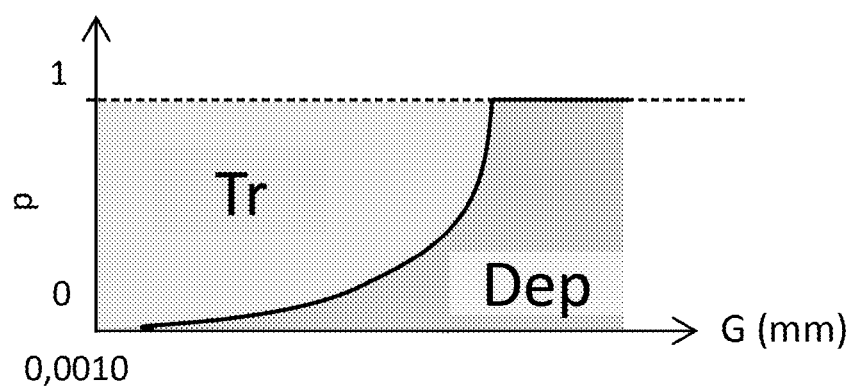
FIG. 5b represents an example of deposition probability of a particle with granulometry.

Optionally, but preferably, the Hjulström diagram may be amended to integrate a deposition probability P which value depends on the granulometric diameter of the particle, an exemplary function of deposition probability with granulometric diameter being shown in FIG. 5b for a given velocity.

This allows a more progressive transition between transport and deposition according to the granulometric diameter of the particle than if the diagram was directly applied.

If a particle is displaced, then the particle can only be moved towards seven different directions which are the directions of the cells neighboring the current cell of the particle, including the cells located in a diagonal with respect to the current cell of the particle, except the one from which the particle arrived. Moreover, the displacement is a stochastic movement which comprises two components:

a first stochastic movement called advective movement, according to which the movement of the particle follows the direction of the resulting current in the cell.

A second stochastic movement called dispersive movement, in which the direction of the movement of the particle is random.

The characteristics of advective and dispersive movements are different depending whether they are applied on plume or bottom current.

Advective movement always occurs in plume current, i.e. with a probability of 1, and of the direction of this movement is defined as the direction of the resulting current in the cell.

Dispersive movement always occurs in plume current, i.e. with a probability of 1, and its direction is random. In an embodiment the direction can be chosen randomly among the cells located ahead or on the sides of the cell where the particle is, according to the direction of the resulting current in the cell, in this case there are five possible neighboring cells and the probability that the particle be transported by dispersive movement to one of those cells is 1/5. In another embodiment the direction can be chosen randomly among all the cells surrounding the cell where the particle is, except the one from where the particle arrives. This amounts to seven possible cells with a probability of 1/7 each.

If the current decomposition comprises at least one subsurface current, the advective and dispersive movements of the particles submitted to this current are computed the same way as particles submitted to plume current.

Figure 5C:
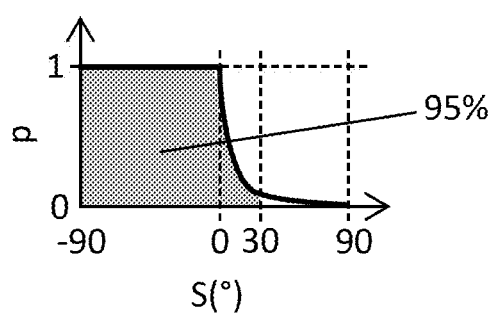
FIG. 5c represents the probability of occurrence of advective displacement of a particle submitted to bottom current.

Regarding the bottom current, the probability p of occurrence of the advective movement is preferably a function of the slope S of the water bottom on which the particle is, an example of which is shown in FIG. 5c, such that no advective movement occurs against the slope of the water bottom. If advective movement occurs, its direction is that of the resulting current in the cell.

The probability of occurrence of dispersive movement for a particle exposed to bottom current is 1, and its direction is random but probabilized according to the slope of the water bottom such that the probability of the particle being transported up the slope is less that the probability of the particle being transported down the slope or sideways.

Hence in each cell, and for each particle, step 500 comprises determining if the particle is deposited or displaced and, if the particle is displaced, determining the movement of the particle according to the subcurrent (plume/subsurface/bottom) to which it is submitted. Advective displacement of the particle is determined first, which results in the particle being transported once in a neighbouring cell, and then dispersive displacement of the particle is determined, which results in the particle being transported another time to another cell. If both advective and dispersive movement occur, the displacement of each particle in one iteration of claim 500 is thus of two cells, or possibly of zero cell if a particle, displaced to a new cell by advective movement, is displaced back to its initial position by the dispersive movement.

Moreover, step 500 is iterated until all particles are either deposited or have exited the gridded model, which is shown in FIGS. 2a and 2b by dotted arrows. It means that for each particle, once this particle has been displaced, step 500 is iterated again to check is the particle should be deposited or transported, and if so it is transported, until the particle reaches a cell where it is deposited or until it leaves the model.

At the end of step 500, a number of particles have been deposited in each cell, which results in an additional time-layer which thickness corresponds to a layer of sediments deposited during the period of time represented by the time-layer.

Figure 3B:
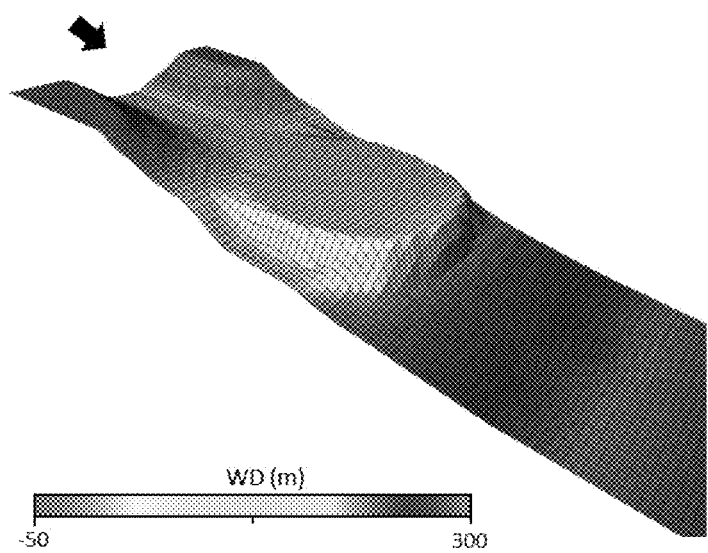

With reference to FIG. 3b, one can see an exemplary evolution of the topography shown in FIG. 3a after a number of iterations of the method, representing the addition of a same number of time-layers. In the example of FIG. 3b the topography which is shown is obtained after 50 iterations of the method, with the simulation of the water current induced by the river mouth. One can in particular notice the deposition of sediments at the vicinity of the river mouth, reducing the water depth of the cells at this place.

During a step 600 the topography of the geological model of the area is updated to take into account the sediments deposited at the end of step 500. Step 600 may also update the topography according to eustatism and subsidence, i.e. respectively the reference water level and the ground level, by updating the height along z of each cell and the water depth of each cell.

The determination of the direction and velocity of each of a river-induced current, wind-induced current, tidal current and oceanic current will now be described.

River-Mouth Current

Figure 6A:
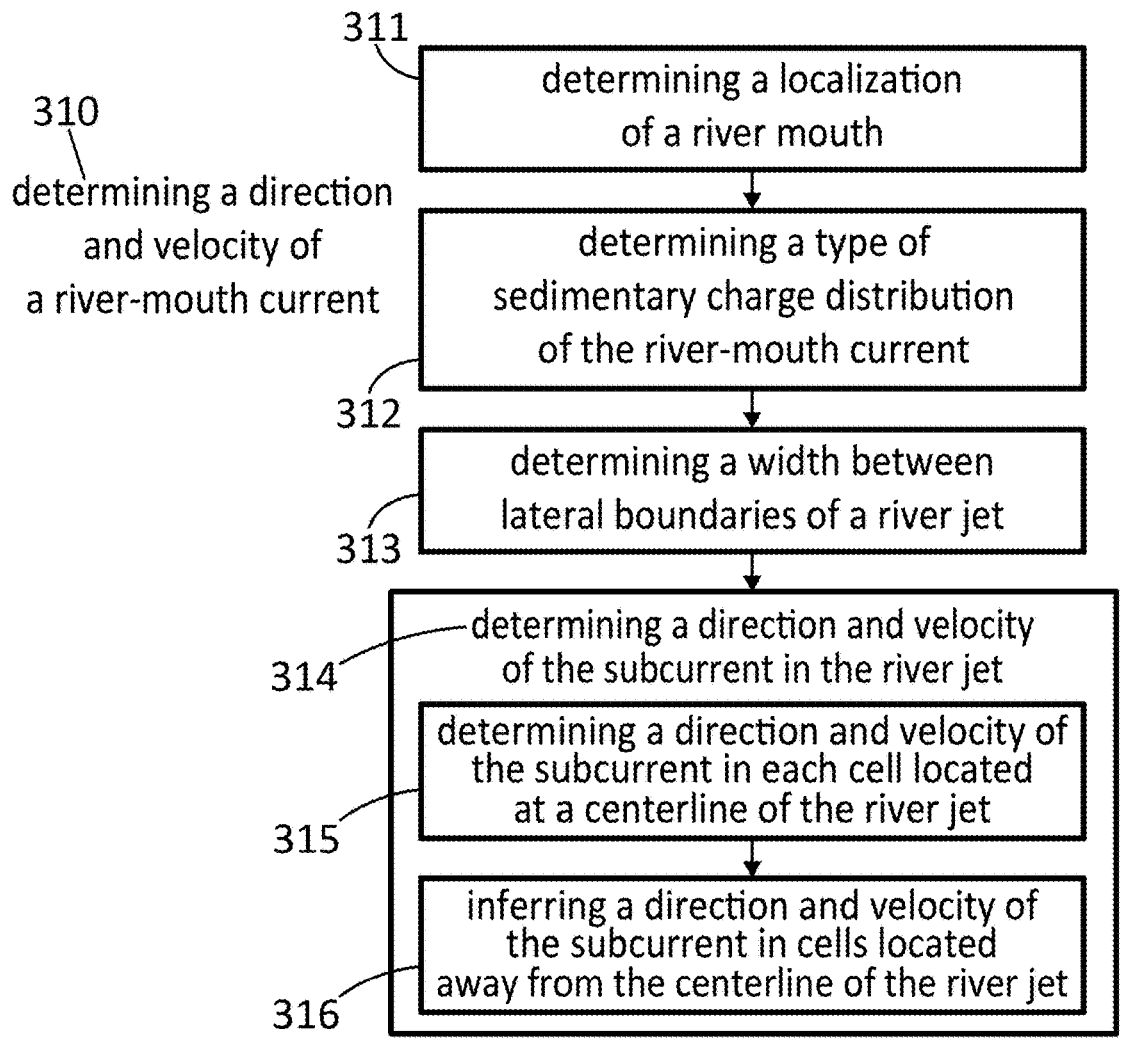
FIG. 6a is a flow chart describing the modelling of river mouth current.

In FIG. 6a is illustrated a flow chart of the main steps for determining 310 the direction and velocity of a river-mouth current.

A first step is determining 311 the localization of a river mouth. The river mouth is located on a shoreline, which position is determined based on the water depth assigned to each cell, as the shoreline is the line where the water depth of the cells becomes equal to 0. During a first iteration of the method and of this step, the localization of the river mouth is preferably set by the user at step 90 as one or a plurality of cells located on the shoreline.

However, for a subsequent iteration of the method, the shoreline can change, due for instance to a change in water depth of each cell, which can itself result from the deposition of particles in the cell. In that case, determining 311 the localization of the river mouth comprises updating the localization of the river mouth from its previous localization. This update is performed by updating the position of the shoreline, according to the updated topography obtained at step 600 and the updated water depth assigned to each cell. Then the updated localization of the river mouth is set as the intersection between the updated shoreline and the line of greatest topographic slope between the previous localization of the river mouth and the updated shoreline.

Step 310 then comprises determining 312, a type of sedimentary charge distribution of the river-mouth current, among a homopycnal distribution, a hyperpycnal distribution and a hypopycnal distribution.

To this end, the velocity of the water at the river mouth is computed from the volumetric flow of the river, the width of the river at the river mouth and the water height of the river at the river mouth, these parameters being set at step 90 and optionally changed at step 99. The density of the water brought by the river is then inferred from the velocity of the water at the river mouth and the volume of sediments brought by the river over a period of time T corresponding to a time layer, said volume being defined from the supply model of the river.

The obtained density is then compared to the density of the water in which the river flows, which is either a density of sea water or a density of lake water.

If the compared densities are equal within a predetermined tolerance, then the sedimentary charge distribution of the river-mouth current is homopycnal.

If the density of the water brought by the river exceeds the density of the water in which the river flows, then the sedimentary charge distribution is hyperpycnal, meaning that the water brought by the river will flow mostly along water bottom.

If the density of the water brought by the river is below the density of the water in which the river flows, then the sedimentary charge distribution is hypopycnal, meaning that the water brought by the river will flow mostly along water surface.

The sedimentary charge distribution of the river-mouth current defines the repartition, among the subcurrents forming the river-mouth current, of the particles introduced at step 400 by the river.

Preferably, a homopycnal distribution corresponds to equivalent proportions of particles between plume subcurrent, bottom subcurrent, and, if applicable, subsurface current.

A hyperpycnal distribution corresponds to a greater proportion of particles introduced in bottom current than in plume current. For instance, if a subsurface current is modelled, the proportions of particles in each subcurrent may be chosen among the following ranges:

Between 70% and 100% of the particles being introduced in the bottom current,

Between 0 and 30% of the particles being introduced in the subsurface current, and Between 0 and 10% of the particles being introduced in the plume current.

Of course the sum of the proportions must be equal to 100%.

A hypopycnal distribution corresponds to a greater proportion of particles introduced in the plume current than in the bottom current. For instance, if a subsurface current is modelled, the proportions of particles in each subcurrent may be chosen among the following ranges:

Between 70% and 100% of the particles being introduced in the plume current,

Between 0 and 30% of the particles being introduced in the subsurface current, and Between 0 and 10% of the particles being introduced in the bottom current, With the sum of the proportions being equal to 100%.

In addition, the sedimentary charge distribution of the water current defines the value of a parameter $\xi_s$ assigned to each subcurrent, and which is used in the modelling of the current described below if the current has hyperpycnal or hypopycnal sedimentary charge distribution.

If the current has hyperpycnal charge distribution, then the value of the coefficient $\xi_s$ assigned to the bottom current, for instance comprised between 16, and 18, for instance equal to 17, is strictly greater than the value of the coefficient assigned to the subsurface current, if any, which is for instance comprised between 10 and 12, for instance equal to 11, and which is itself strictly greater than the value of the coefficient assigned to the plume current, for instance comprised between 2 and 7, for instance equal to 5.

If the current has hypopycnal charge distribution, then the value of the coefficient $\xi_s$ assigned to the plume current, for instance comprised between 16, and 18, for instance equal to 17, is strictly greater than the value of the coefficient assigned to the subsurface current, if any, which is for instance comprised between 10 and 12, for instance equal to 11, and which is itself strictly greater than the value of the coefficient assigned to the bottom current, for instance comprised between 2 and 7, for instance equal to 5.

Figure 6B:
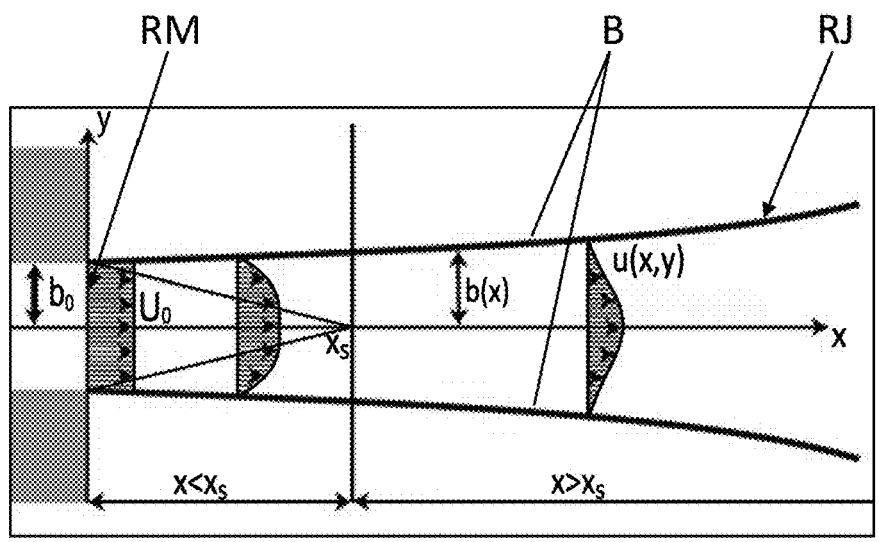
FIG. 6b shows the notation used for modelling a river mouth current.

Moreover, the river-induced current only occurs within a river jet RJ which is shown schematically in FIG. 6b. The river jet RJ extends from the river mouth RM along a direction x, and extends laterally along a direction y orthogonal to x, between two lateral boundaries B, which are considered at equal distances from a centerline of the riverjet. It is considered that the rivermouth extends along the direction y, and the centerline of the riverjet extends, from the middle of the river mouth, along the axis x i.e. perpendicularly to the direction of the river mouth.

Thus, step 310 then comprises determining 313 a width between lateral boundaries B of the river jet, as a function of the distance along axis x from the river mouth.

The width of the river jet is defined according to the publication of Fagherazzi et al., "Dynamics of river mouth deposits", Rev. Geophys.n, 53, 642-672, doi: 10.1002/2014RG000451.

The computation of the width of the river jet with the distance x of the river mouth also depends on the sedimentary charge distribution of the current.

If the sedimentary charge distribution of the current is homopycnal, then the width is defined as follows:

$$\bar{b} = \frac{e^{\frac{S}{2}\xi}}{I_2}\left[1 + \frac{4\alpha I_2}{SI_1}\left(1 - e^{-\frac{S}{2}\xi}\right)\right]$$

where:

$$\bar{b} = \frac{b(x)}{b_0}$$

$$\xi = x/b_0$$

and S is a parameter computed from the friction factor, the width of the river mouth and the water depth at the river mouth, α, $I_1$ and $I_2$ are fixed parameters, b(x) is the half-width of the river jet at a distance x from the river mouth, and $b_0$ is the half-width of the river mouth.

S may be computed as follows:

$$S = \frac{Fb_0}{2H}$$

Where F is the friction factor assigned to the current, which is comprised between 0 and 1, for instance between 0 and 0, 1, $b_0$ is the width of the river mouth, which is defined by the user, and H is the water depth of the river mouth.

With reference to FIG. 6b, if the sedimentary charge distribution of the current is hyperpycnal or hypopycnal, a distance $x_s$ from the river mouth is defined by:

$$x_s = b_0 \cdot \xi_s$$

Where $x_s$ represents a distance from the river mouth at which the flow of the river becomes established.

In that case, for each subcurrent, the width of the river jet is defined as follows:

$$\begin{cases} \bar{b} = \frac{e^{\frac{S}{2}\xi}}{I_2}\left[1 + \frac{4\alpha I_2}{SI_1}\left(1 - e^{-\frac{S}{2}\xi}\right)\right] \text{ if } x \geq x_s \\ \bar{b} = 1 \text{ if } x < x_s \end{cases}$$

For a given current having a determined sedimentary charge distribution, as the value of the coefficient depends on the considered subcurrent, the position of $x_s$ also depends on the subcurrent and hence the width of the river jet depends on the depth which is considered (each subcurrent corresponding to a respective depth).

The method then comprises, for each subcurrent, a sub-step 314 of determining a direction and velocity of the sub-current in each cell located within the respective river jet.

This substep comprises determining 315 the direction and velocity of the subcurrent in each cell located at a centerline of the jet, as a function of the distance between the cell and the river mouth, and then inferring 316 a direction and velocity of the subcurrent in cells located away from the centerline of the river jet, as a function of the distance between the cell and the centerline of the jet, and between the cell and the river mouth.

At the river mouth, and along all the width of the river mouth, the velocity of each sub-current is equal to a velocity $u_0$ which is determined based on the volumetric flow of the river Q, set by the user, the water height H at the river flow and the width $b_0$ of the river mouth, based on the following formula: $u_0 = Q/2Hb_0$.

Regarding the centerline of the jet (step 315), the direction of each subcurrent is along the centerline and the axis x, i.e. perpendicular to the direction along which extends the width of the river mouth, and extending away from the river mouth. Regarding a current having either hypopycnal or hyperpycnal sedimentary charge distribution, the velocity of a sub-current in a cell located at the centerline of the jet, and at a distance x from the river mouth is then given by the following equation:

$$\begin{cases} u(x) = u_0 \text{ if } x < x_s \\ \bar{u}(x) = \frac{e^{-\frac{S}{2}\xi}}{\left[1 + \frac{4\alpha I_2}{SI_1}\left(1 - e^{-\frac{S}{2}\xi}\right)\right]} \text{ if } x \geq x_s \end{cases}$$

$$\bar{u}(x) = \frac{u(x)}{u_0}$$

$$\xi = x/b_0$$

For a given current having a determined sedimentary charge distribution, as the value of the coefficient $\xi_s$ depends on the considered subcurrent, the position of $x_s$ also depends on the subcurrent and hence the velocity of the river current depends on the depth which is considered (each subcurrent corresponding to a respective depth).

For a current having homopycnal sedimentary charge distribution, the velocity of a sub-current in a cell located at the centerline of the jet and at a distance x from the river mouth is given by the following equation:

$$\bar{u}(x) = \frac{e^{-\frac{S}{2}\xi}}{\left[1 + \frac{4\alpha I_2}{SI_1}\left(1 - e^{-\frac{S}{2}\xi}\right)\right]}$$

Then, regarding cells located off the centerline of the river jet (step 316), the direction of a sub-current forms an angle with the centerline which is a linear function of the distance between the cell and the centerline, such that the angle is 0 at the centerline, and is equal to the angle formed between a lateral boundary B and the centerline at the lateral boundary. The sub-current is furthermore oriented away from the river mouth.

The velocity of a subcurrent in those cells depends on the distance along the y axis between the cell and the centerline, and the distance along x between the cell and the river mouth RM. With reference to FIG. 6b, regarding currents having homopycnal sedimentary charge distribution, or, for currents having hyperpycnal or hypopycnal sedimentary charge distribution, only if the cell is located at a distance x from the river mouth greater than $x_s$, the velocity of the subcurrent in the cell is a linear function of the distance along y between the cell and the centerline of the river jet, decreasing from a maximum value at the centerline (which is the value computed according to the equation above) until reaching a value of 0 at the lateral boundaries of the river jet.

For currents having hyperpycnal or hypopycnal sedimentary charge distribution, and if the cell is located at a distance x from the river mouth lower than $x_s$ then, the velocity of the subcurrent in the cell is equal to the velocity at the centerline of the river jet, at the same distance x from the river mouth, if the cell is located at a distance along the y axis from the centerline lower than $L_{lim}$, defined such that:

$$L_{lim} = b_0 \cdot \frac{x_s - x}{x_s}$$

For a distance along y greater than $L_{lim}$, the velocity is a linear function of the distance along y between the cell and the centerline, from a maximum value at a distance equal to Llim, to a value of 0 at the lateral boundaries of the river jet.

Wind-Induced Current

Figure 7A:
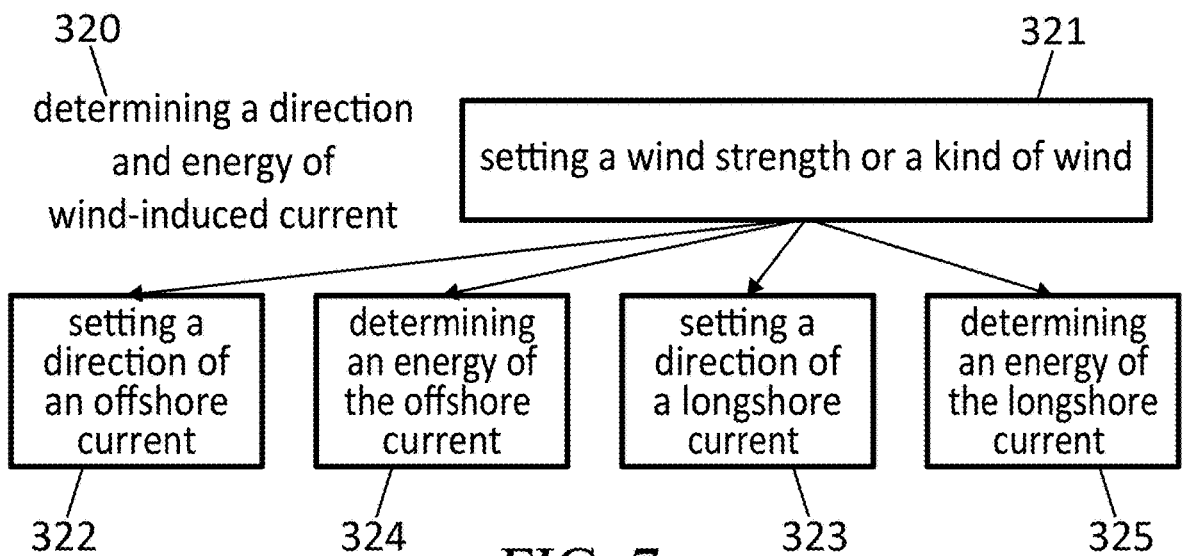
FIG. 7a is a flow chart describing the modelling of wind-induced current.

In FIG. 7a is a flow chart of the determination 320 of direction and energy of wind-induced current, the velocity being deduced from the computed energy and the volumetric mass of the water. The winds induce the formation of waves at the vicinity of the shoreline. The wind-induced current comprises two components which are an offshore current and a longshore current, hence the determination of the direction and energy of the wind-induced current is performed separately for the offshore and longshore currents, and a direction and energy of the resulting current is then deduced in each cell.

A first step 321 comprises the user setting a wind strength or a kind of wind, which, by use of the Beaufort scale grade, provides:

A wave wavelength $\lambda_{wave}$ induced by the wind,

A wave base water depth $WD_{Base}$, which is the water depth at which the wind produces a current, and which is defined by:

$$WD_{Base} = \frac{\lambda_{wave}}{2}$$

A wave height at wave breaking water depth which is defined by:

$$H_{Wave} = \frac{\lambda_{wave}}{16}$$

and a wave breaking water depth $WD_{Breaking}$, which is defined by:

$$WD_{Breaking} = \frac{H_{Wave}}{0.833}$$

Optionally, this step 321 may also be implemented during the setup step 90 in order to set these parameters for a plurality of time layers, and in that case, these parameters can also be modified during the optional step 99 between two time layers.

A step 322 then comprises setting the direction of the waves $\alpha_{wave}$ induced by the wind, as the direction of the offshore current.

A longshore current is only modelled if the direction of the wind-induced waves forms an angle between 1° and 25° with the shoreline. Thus, if a longshore current occurs, its direction is also set during a step 323 as being parallel to the shoreline (the direction is derived automatically from the direction of the shoreline).

A step 324 then comprises determining the energy of the offshore current. This step first comprises computing the offshore current maximum energy, which is obtained from the wind speed (which is set by the user or determined from the Beaufort scale grade), and a windspeed conversion factor $ETQ_{Wind}$, which can be set by the user according to known graphs. For instance the windspeed conversion factor may be about 3%.

The offshore current maximum energy is given by:

$$E_{max,CC,Wi} = \rho \text{Windspeed}^2 * ETQ_{Wind}$$

With ρ being the volumetric mass of the water (marine water or lake water) in which the current occurs.

Then the energy of the offshore current in each cell is determined by computing first the energy of the plume current and then deducing the energy of the other subcurrents in the same cell from the energy of the plume current.

Figure 7B:
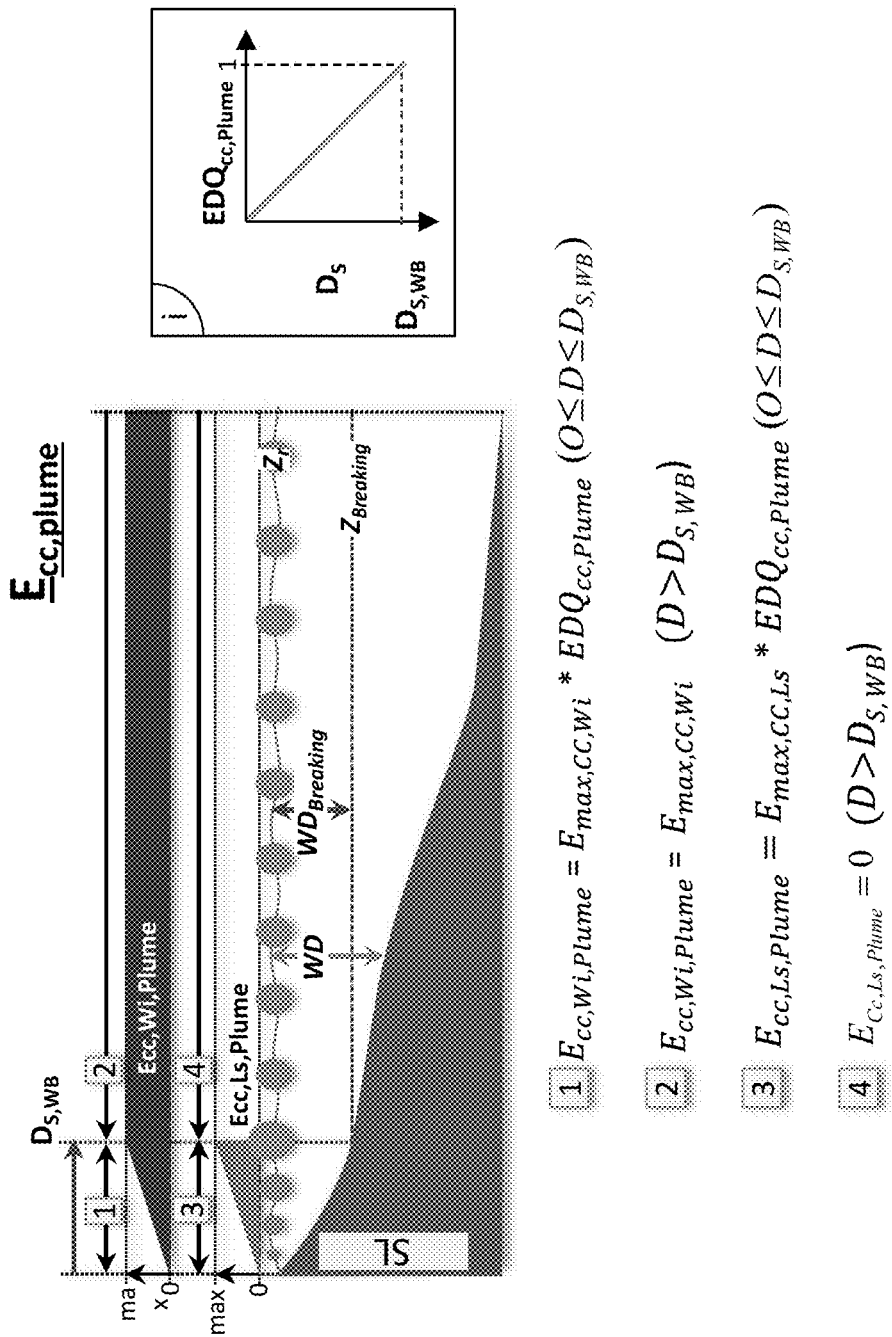
FIGS. 7b to 7d show the computation of the wind-induced plume current and the inferring of the wind-induced subsurface and bottom currents from the wind-induced plume current.

With reference to FIG. 7b, the energy of the offshore plume current is a function of the distance of the cell relative to the shore line, increasing from zero at the shoreline to the maximum value computed above, at a distance $D_{S,WB}$ from the shoreline such that the water depth at this distance is equal to the wave breaking water depth $WD_{Breaking}$, and then the energy remains equal to this maximum value at greater distances from the shoreline.

This function is summarized by the following equation:

$$E_{cc,Wi,Plume} = \begin{cases} E_{max,CC,Wi} * EDQ_{cc,Plume}(D) & \text{if } 0 \leq D \leq D_{S,WB} \\ E_{max,CC,Wi} & \text{if } D_{S,WB} < D \end{cases}$$

Where $EDQ_{Cc,Plume}$ is the function of the increase of the energy of the offshore plume current defined from a distance D from the shoreline comprised between 0 and $D_{S,WB}$. Preferably, function of the increase of the energy from the shore line to the distance of maximum energy is linear, as represented schematically in insert i) of FIG. 7b.

If the currents decomposition comprises one or more subsurface current (FIG. 7c), the subsurface offshore current energy $E_{cc,Wi,subsurf}$ is deduced from the plume offshore current energy $E_{cc,Wi,Plume}$ and from a decrease factor $EDQ_{cc,subsurf}$ applied to the plume current energy, the decrease factor being a function of water depth such that it is equal to 1 at a water depth of 0, and decreases to 0 at a water depth equal to the Wave base water depth $WD_{base}$, as schematically shown in FIG. 6b. The decrease can be linear or exponential as shown in insert ii) in FIG. 7c.

$$E_{cc,subsurf} = \begin{cases} E_{cc,Wi,Plume} * EDQ_{cc,subsurf} & \text{if } 0 \leq WD_{subsurf} \leq WD_{Base} \\ 0 & \text{if } WD_{subsurf} > WD_{Base} \end{cases}$$

The water depth used to compute the decrease factor is the water depth $WD_{subsurf}$ at which the subsurface current occurs, an example of which has been defined above.

Figure 7C:
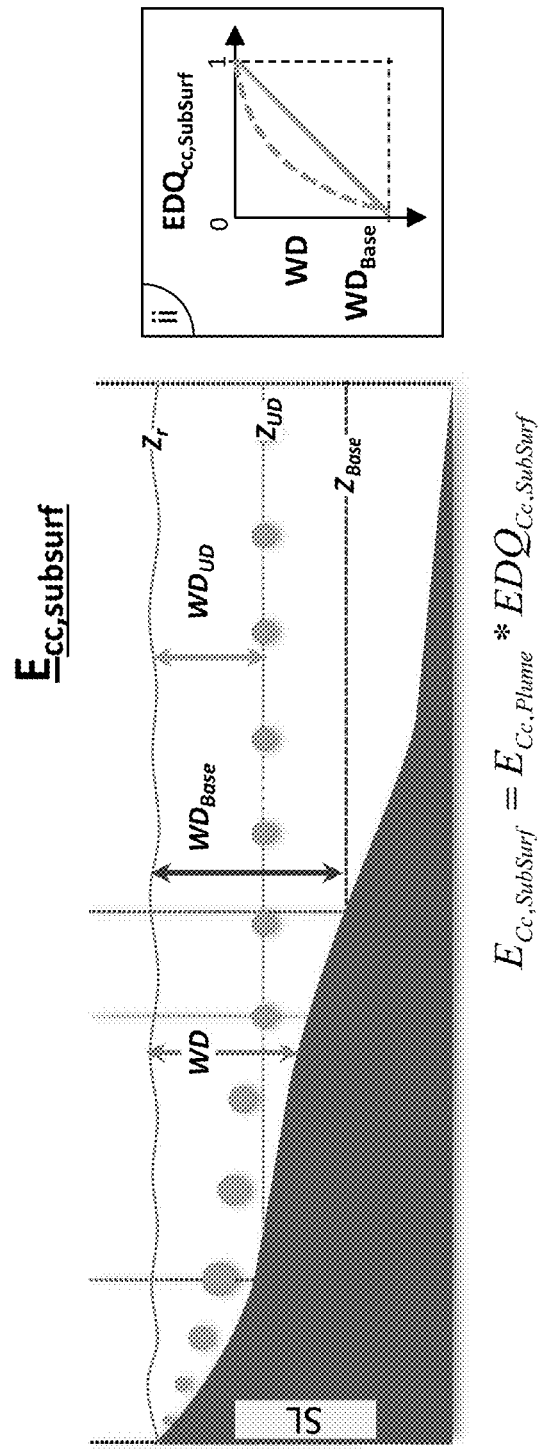
Figure 7D:
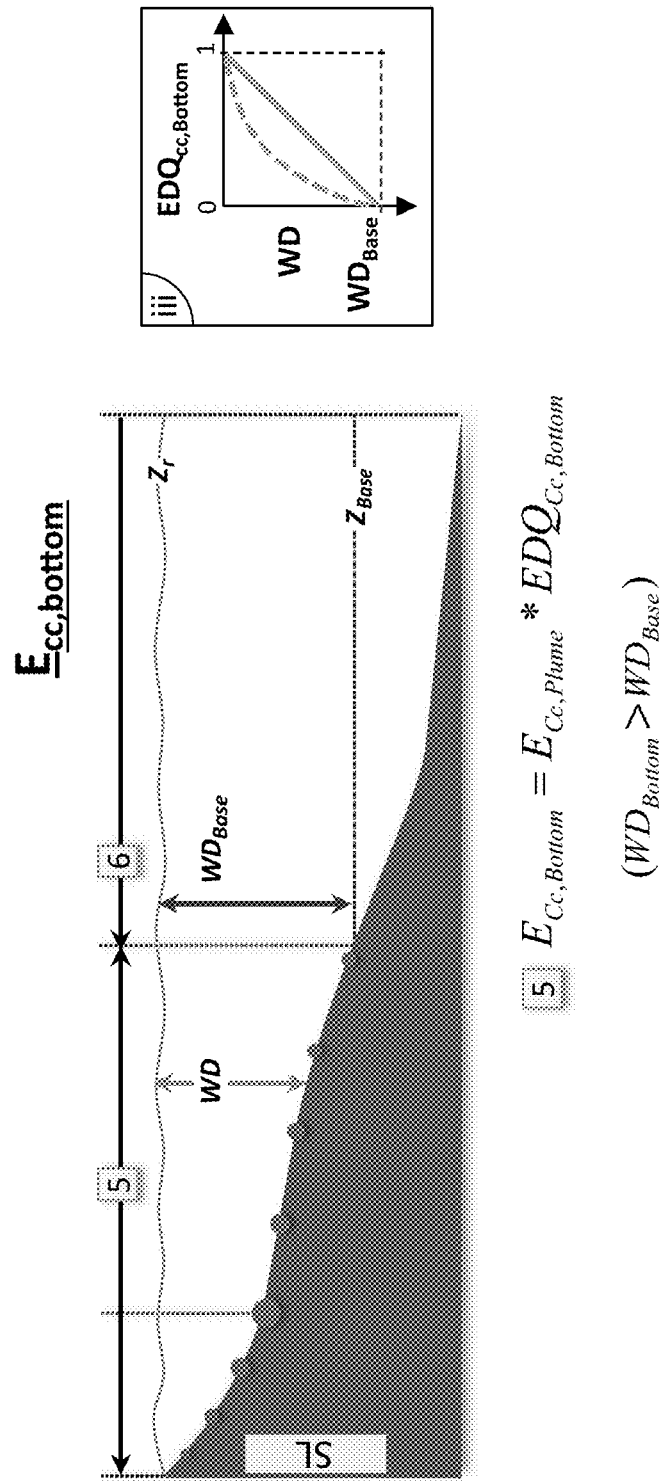

Last, as illustrated in FIG. 7d, the energy of the bottom offshore current $E_{cc,wi,bottom}$, either offshore or longshore, is also deduced from the energy of the offshore plume current $E_{cc,Wi,Plume}$ and from a decrease factor $EDQ_{cc,bottom}$ applied to the offshore plume current energy, the decrease factor being a function of water depth such that it is equal to 1 at a water depth of 0, and decreases to 0 at a water depth equal to the Wave Base water depth $WD_{Base}$. The decrease can be linear or exponential as shown in insert iii) in FIG. 7d.

$$E_{cc,Wi,bottom} = \begin{cases} E_{cc,Wi,Plume} * EDQ_{cc,bottom} & \text{if } 0 \leq WD_{bottom} \leq WD_{Base} \\ 0 & \text{if } WD_{bottom} > WD_{Base} \end{cases}$$

The water depth used to compute the decrease factor is the water depth WD assigned to the cell.

Back to FIG. 7a, if a longshore current occurs, the determination of its energy is performed during a step 325 and first comprises computing its maximum energy according to the following equation:

$$E_{max,Cc,Ls} = \rho g H_{Wave} \sin^2 \alpha_{wave} \cos^2 \alpha_{wave}$$

Where $\alpha_{wave}$ is the angle of the waves relative to the shoreline, set at step 322. Back to FIG. 7b, the energy of the longshore current is then determined by computing, in each cell, the energy of the longshore plume current and then deducing the energy of the other sub-currents in the same cell from the energy of the longshore plume current.

The energy of the longshore plume current is a function of the distance of the cell relative to the shore line, increasing from zero at the shoreline to the maximum value $E_{max,Cc,Ls}$ computed above, at the distance $D_{S,WB}$ from the shoreline such that the water depth at this distance is equal to the wave breaking water depth $WD_{Breaking}$, and for greater distances from the shore the energy of the longshore plume current is 0.

This function is summarized by the following equation:

$$E_{cc,Ls,Plume} = \begin{cases} E_{max,CC,Ls} * EDQ_{cc,Plume}(D) & \text{if } 0 \leq D \leq D_{S,WB} \\ 0 & \text{if } D_{S,WB} < D \end{cases}$$

The function of the increase of the energy of the longshore plume current between the shoreline and $D_{S,WB}$ is preferably the same as that of the offshore plume current.

Back to FIG. 7c, if the currents decomposition comprises one or more subsurface current, the subsurface longshore current energy $E_{cc,Ls,subsurf}$ is deduced from the longshore plume current energy $E_{cc,Ls,Plume}$ and from the decrease factor $EDQ_{cc,subsurf}$ described above, by:

$$E_{cc,Ls,subsurf} = E_{cc,Ls,Plume} * EDQ_{cc,subsurf}$$

As the longshore and the offshore subsurface currents are derived respectively from the longshore and the offshore plume currents in identical manners, the indices "wi" and "ls" denoting respective offshore and longshore, have been removed from FIG. 7c.

Similarly, with reference to FIG. 7d, the energy of the bottom longshore current $E_{cc,Ls,bottom}$ is also deduced from the energy of the longshore plume current $E_{cc,Ls,Plume}$ and from the decrease factor $EDQ_{cc,bottom}$ applied to the longshore plume current energy, by:

$$E_{cc,Ls,bottom} = E_{cc,Ls,Plume} * EDQ_{cc,bottom}$$

As the longshore and the offshore bottom currents are derived respectively from the longshore and the offshore plume currents in identical manners, the indices "wi" and "ls" denoting respective offshore and longshore, have been removed from FIG. 7d.

Tidal Current

As indicated above in the description of the setup step 90, the modelling of the tidal current requires decomposing a time layer corresponding to a period of time T into an even number 2k of at least two computation layers (k≥1), corresponding to subperiods of time of a duration T/2k. During each computation layer, only one of a rising tide current and a falling tide current is modelled at step 300, and the particles introduced at step 400 are transported according to said current at step 500.

Accordingly, a step 300 of modelling tidal current during a first iteration of a computation layer comprises modelling one of a rising tide current and a falling tide current, and a step 300 of modelling tidal current in a successive iteration of a computation layer comprises modelling the other of a rising tide current and a falling tide current.

Figure 8A:
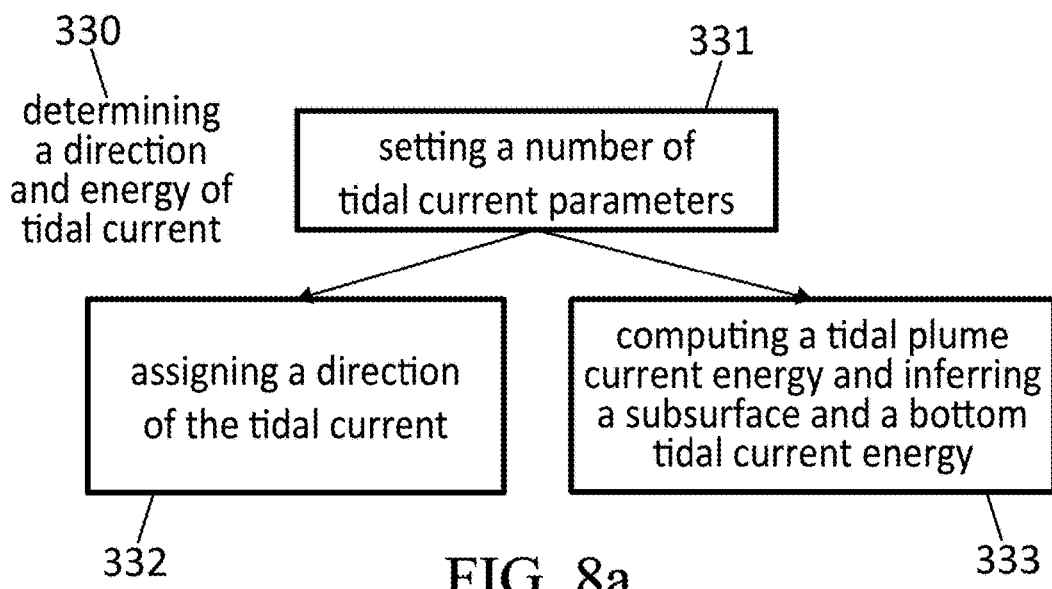
FIG. 8a is a flow chart describing the modelling of tidal current.

With reference to FIG. 8a is shown a flow chart of the determination 330 of direction and energy of tidal current, the velocity being deduced from the energy with the volumetric mass of sea water. This determination 330 comprises a first step 331 of setting a number of parameters relevant for the next steps. A first parameter is the tidal range class, which is preferably set by the user, for instance based on a tides classification such as Davies or Hayers classification. This tidal range class allows deducing the tidal range $H_{TR}$, which is the height difference between the sea level at low tide and the sea level at high tide. Starting from the reference sea level $Z_r$, the high tide level $Z_{HT}$ and low tide level $Z_{LT}$ are given by:

$$Z_{HT} = Z_r + \frac{H_{TR}}{2}$$

$$Z_{LT} = Z_r - \frac{H_{TR}}{2}$$

The tidal range class also provides a tidal limit coefficient $Q_{TL}$, which allows computing a water depth of influence of the tidal currents $WD_{TL}$ such that:

$$WD_{TL} = H_{TR} * Q_{TL}$$

Optionally, this step 331 may also be implemented during the setup step 90 in order to set these parameters for a plurality of time layers, and in that case, these parameters can also be modified during the optional step 99 between two time layers.

During a substep 332, a direction of the tidal current is then assigned to each cell. To do so, a high tide shoreline is determined from the high tide water level, and defined as the set of cells which z position is equal to $z_{HT}$. Indeed, contrary to the other types of currents, the tidal current induces a change in the shoreline and for the computation of the direction and energy of this current the shoreline that is takein into account is the high tide shoreline.

The direction of the tidal current is then inferred from the position of each cell relative to the high tide shoreline, as being perpendicular to the shoreline and:
  if the tidal current is a falling tide current, the direction of the current is away from the shoreline, and
  if the tidal current is a rising tide current, the direction of the current is towards the shoreline.

During a substep 333, the energy of the tidal current is computed, said energy being the same for rising tide current and falling tide current. This energy is first computed for a plume tidal current, and then the energy of the plume tidal current is used to infer the energy of the subsurface tidal current and the bottom tidal current.

Figure 8B:
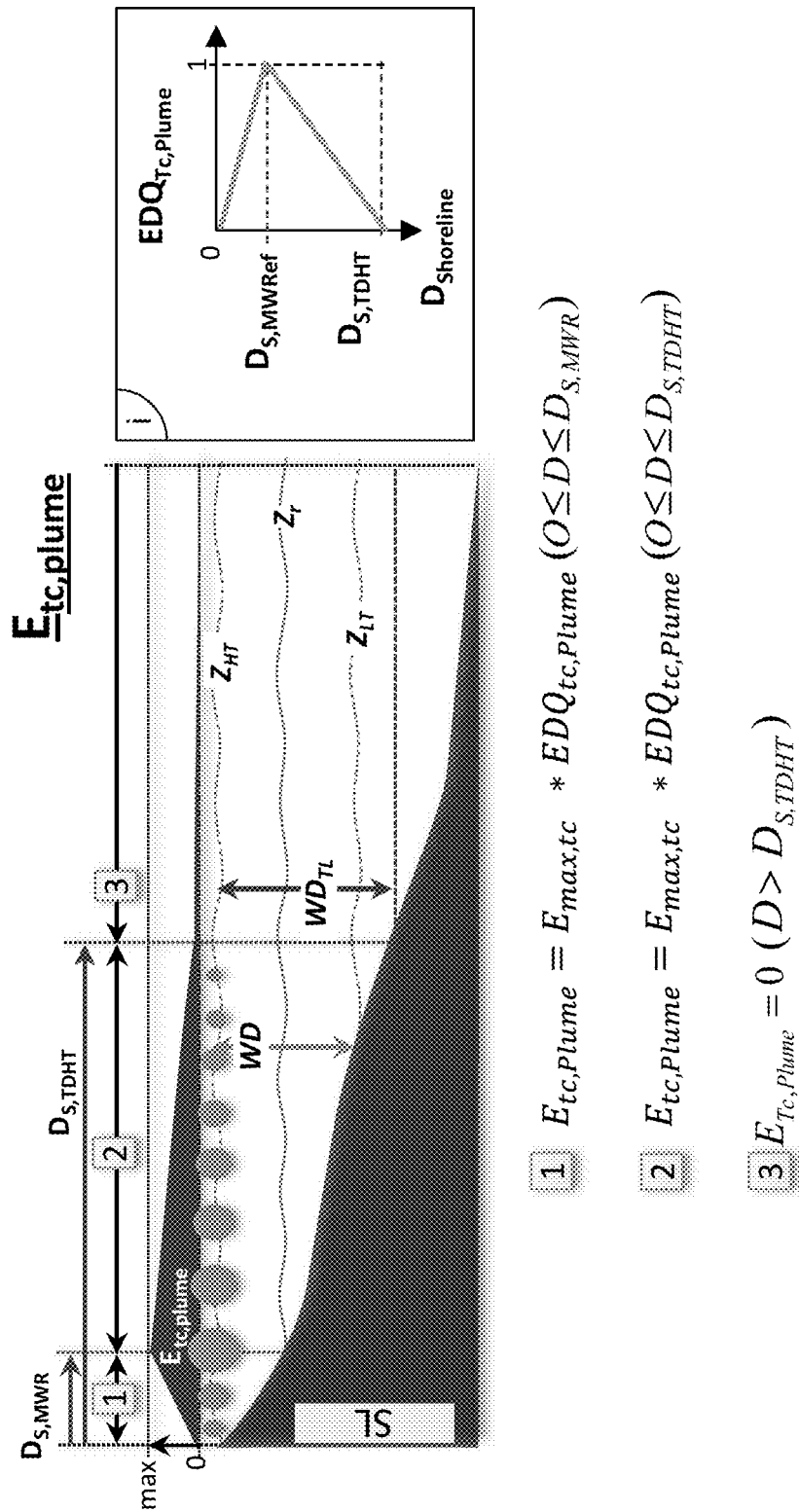
FIGS. 8b to 8d show the computation of the tidal plume current and the inferring of the tidal subsurface and bottom currents from the tidal plume current.

With reference to FIG. 8b, the energy of the tidal plume current is a function of the distance of the cell relative to the high tide shore line, increasing from zero at the high tide shoreline to a maximum value $E_{max,tc}$ which is preferably set by the user, at a distance $D_{S,MWR}$ from the shoreline such that the position along z of a cell at this distance is equal to the reference water level $z_r$, and then decreasing from this distance back to 0 at a distance $D_{S,TDHT}$ from the shoreline such that the water depth of a cell at this distance is equal to the water depth of influence of the tidal current $WD_{TD}$. The water depth of influence of the tidal current is computed from the water level at high tide.

This function is summarized by the following equation:

$$E_{tc,Plume} = \begin{cases} E_{max,tc} * EDQ_{tc,Plume}(D) & \text{if } 0 \leq D \leq D_{S,TDHT} \\ 0 & \text{if } D_{S,TDHT} < D \end{cases}$$

Where $EDQ_{tc,Plume}$ is the function of the variation of the energy of the tidal plume current defined from a distance D from the high tide shoreline comprised between 0 and $D_{S,TDHT}$. Preferably, and as shown in insert i) of FIG. 8b, the function comprises two linear segments, one defined between 0 and $D_{S,MWR}$ and the other between $D_{S,MWR}$ and $D_{S,TDHT}$.

Figure 8C:
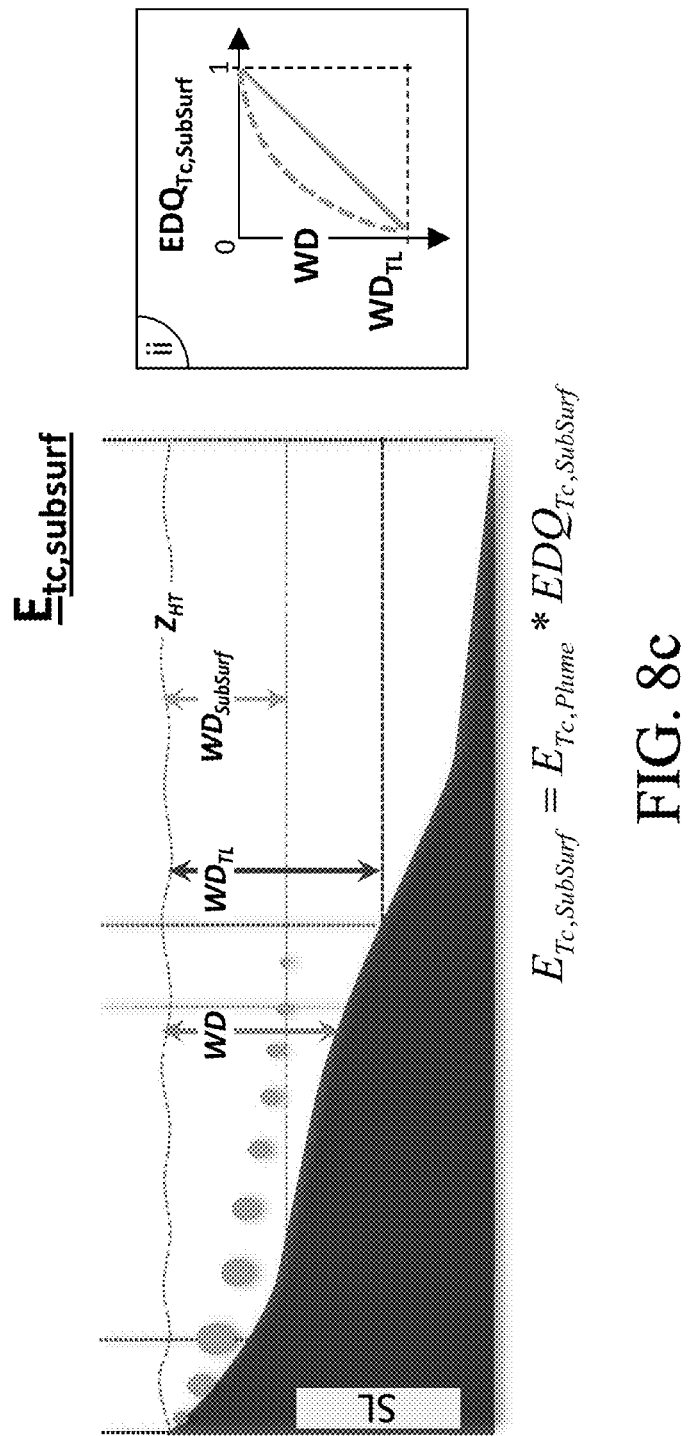

If the currents decomposition comprises one or more subsurface current, the subsurface tidal current energy $E_{tc,subsurf}$ is deduced from the tidal plume current energy $E_{tc,plume}$ and from a decrease factor $EDQ_{tc,subsurf}$ applied to the tidal plume current energy, the decrease factor being a function of water depth $WD_{subsurf}$ such that it is equal to 1 at a water depth of 0, and decreases to 0 at a water depth equal to the water depth of tidal current limit $WD_{TL}$, as schematically shown in FIG. 8c. The decrease can be linear or exponential as shown in insert ii) of FIG. 8c.

$$E_{tc,subsurf} = \begin{cases} E_{tc,Plume} * EDQ_{tc,subsurf} & \text{if } 0 \leq WD_{subsurf} \leq WD_{TidalLimit} \\ 0 & \text{if } WD_{subsurf} > WD_{TidalLimit} \end{cases}$$

Figure 8D:
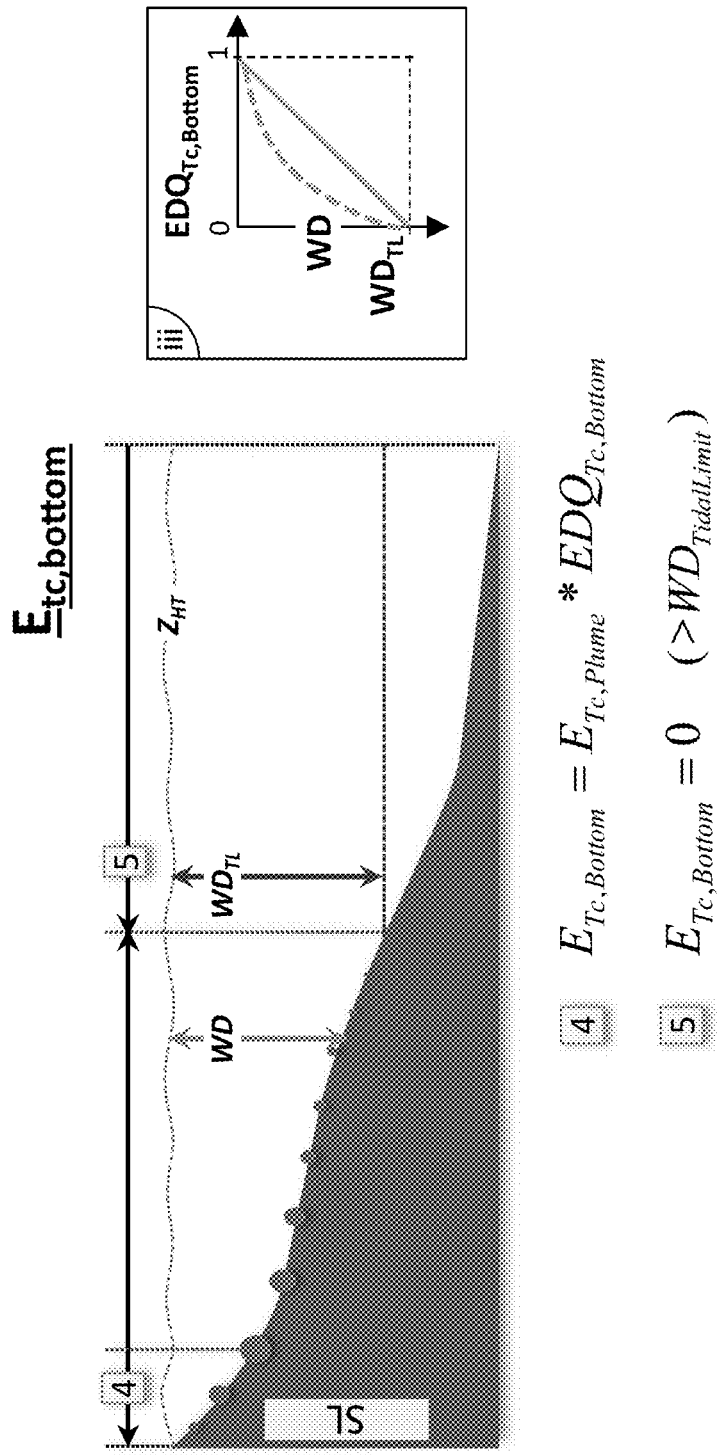

Last, the energy of the tidal bottom current $E_{tc,bottom}$ is also deduced from the energy of the tidal plume current $E_{tc,Plume}$ and from a decrease factor $EDQ_{tc,bottom}$ applied to the tidal plume current energy, the decrease factor being a function of water depth $WD_{bottom}$ such that it is equal to 1 at a water depth of 0, and decreases to 0 at a water depth equal to the water depth of tidal surface current limit $WD_{TidalLimit}$. The decrease can be linear or exponential as show in the insert iii) of FIG. 8d.

$$E_{tc,bottom} = \begin{cases} E_{tc,Plume} * EDQ_{tc,bottom} & \text{if } 0 \leq WD_{bottom} \leq WD_{TL} \\ 0 & \text{if } WD_{bottom} > WD_{TL} \end{cases}$$

The water depth $WD_{bottom}$ used to compute the decrease factor is the water depth WD assigned to the cell.

Oceanic Current

Figure 9A:
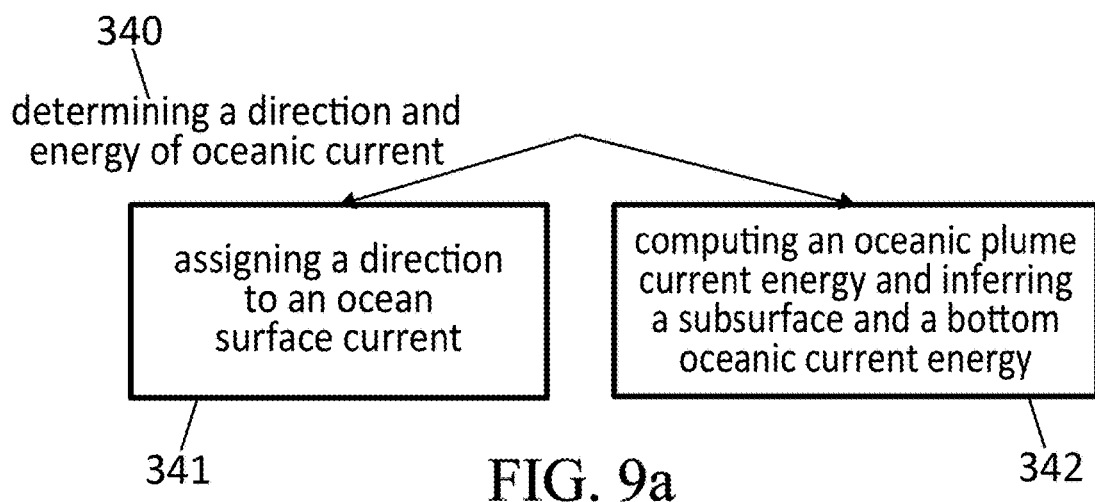
FIG. 9a is a flow chart describing the modelling of ocean surface current.

In FIG. 9a is a flow chart of the determination 340 of direction and energy of oceanic current, the velocity being deduced from the energy using the volumetric mass of sea water. This step uses a parameter which can be set by the user or by default-setting, and which is the water depth of ocean surface current limit $WD_{osclimit}$. It is for instance equal to 150 m.

The determination of the direction 341 of the oceanic current depends on the location of the considered cell. Indeed, the main oceanic currents have a loop trajectory which is, along the coasts, parallel to the latter, and between the coasts, roughly parallel to the equator. The rotation direction of the currents depends on the hemisphere, as they are clockwise in the Northern hemisphere and counterclockwise in the Southern hemisphere.

Thus these currents directions are preferably parameterized within the model so that step 341 comprises assigning a direction to an ocean surface current in a cell according to the location of the cell.

The determination of the energy 342 of the oceanic current in a cell comprises, as for the other currents, computing an oceanic plume current energy in each cell and then inferring a subsurface and a bottom oceanic current energy in each cell.

Figure 9B:
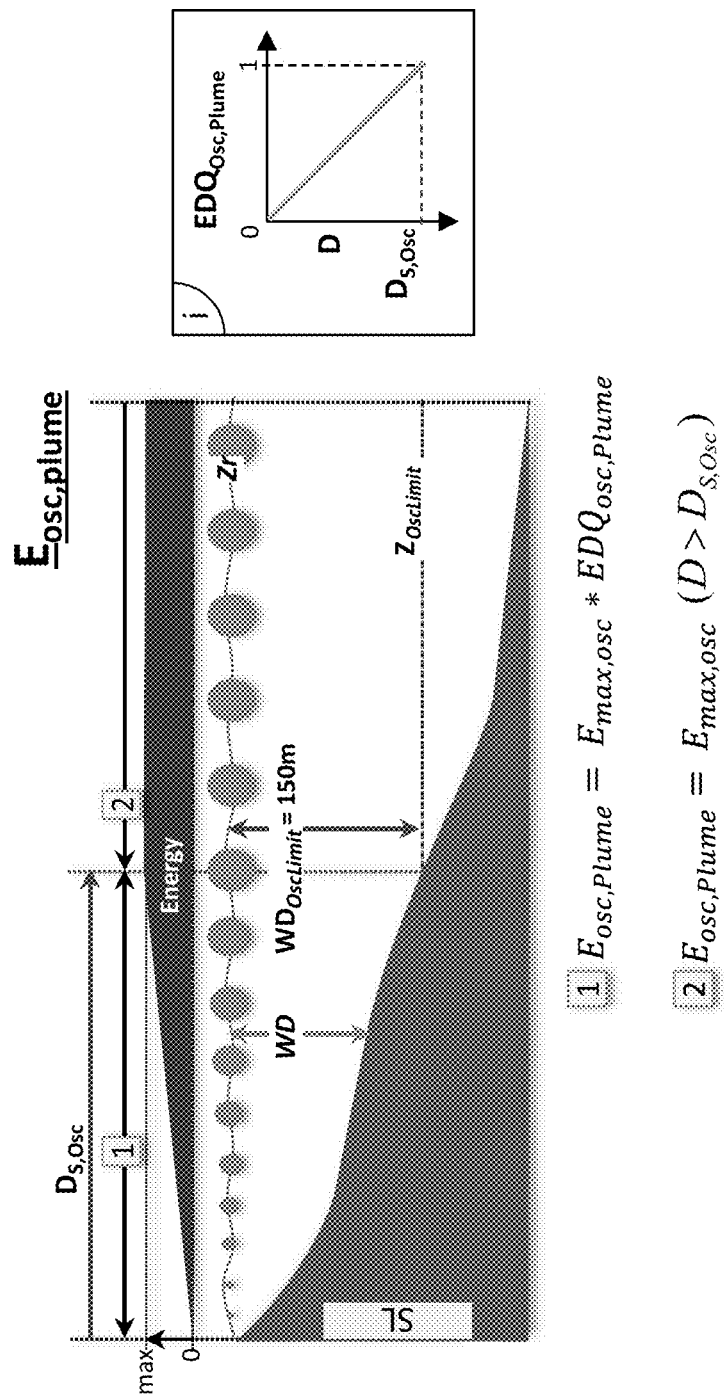
FIGS. 9b to 9d show the computation of the oceanic plume current and the inferring of the oceanic subsurface and bottom currents from the oceanic plume current.

With reference to FIG. 9b, the energy of the oceanic plume current is a function of the distance D of the cell relative to the shore line, increasing from zero at the shoreline to a maximum value which is preferably set by the user, at a distance $D_{S,osc}$ from the shoreline such that the water depth at this distance is equal to the water depth of ocean surface current limit $WD_{osclimit}$, and then the energy remains equal to this maximum value at greater distances from the shoreline.

This function is summarized by the following equation:

$$E_{osc,Plume} = \begin{cases} E_{max,osc} * EDQ_{osc,Plume}(D) & \text{if } 0 \leq D \leq D_{S,osc} \\ E_{max,osc} & \text{if } D_{S,osc} < D \end{cases}$$

Where $EDQ_{osc,Plume}$ is the function of the increase of the energy of the oceanic plume current defined from a distance D from the shoreline comprised between 0 and $D_{S,osc}$. Preferably, the function of the increase of the energy from the shore line to the distance of maximum energy is linear, as represented schematically in insert i) of FIG. 9b.

Figure 9C:
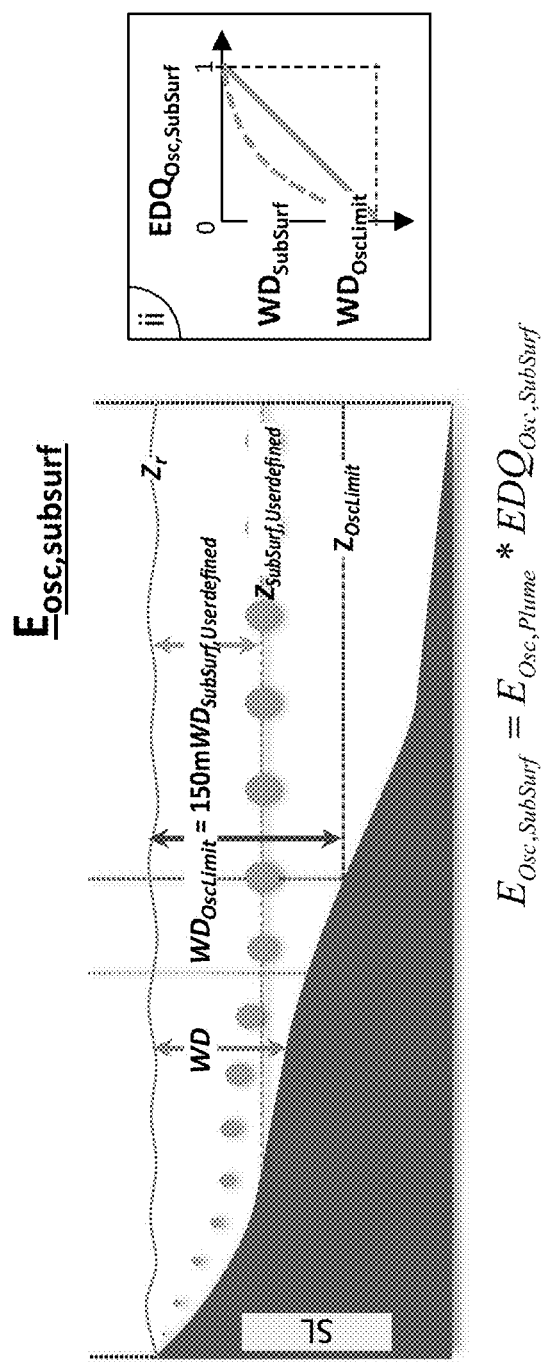

If the currents decomposition comprises one or more subsurface current, the subsurface oceanic current energy $E_{osc,subsurf}$ is deduced from the plume current energy $E_{osc,Plume}$ and from a decrease factor $EDQ_{osc,subsurf}$ applied to the oceanic plume current energy, the decrease factor being a function of water depth $WD_{subsurf}$ such that it is equal to 1 at a water depth of 0, and decreases to 0 at a water depth equal to the water depth of ocean surface current limit, as schematically shown in FIG. 9c. The decrease can be linear or exponential as shown in insert ii) of FIG. 9c.

$$E_{osc,subsurf} = \begin{cases} E_{osc,Plume} * EDQ_{osc,subsurf} & \text{if } 0 \leq WD_{subsurf} \leq WD_{osclimit} \\ 0 & \text{if } WD_{subsurf} > WD_{osclimit} \end{cases}$$

Figure 9D:
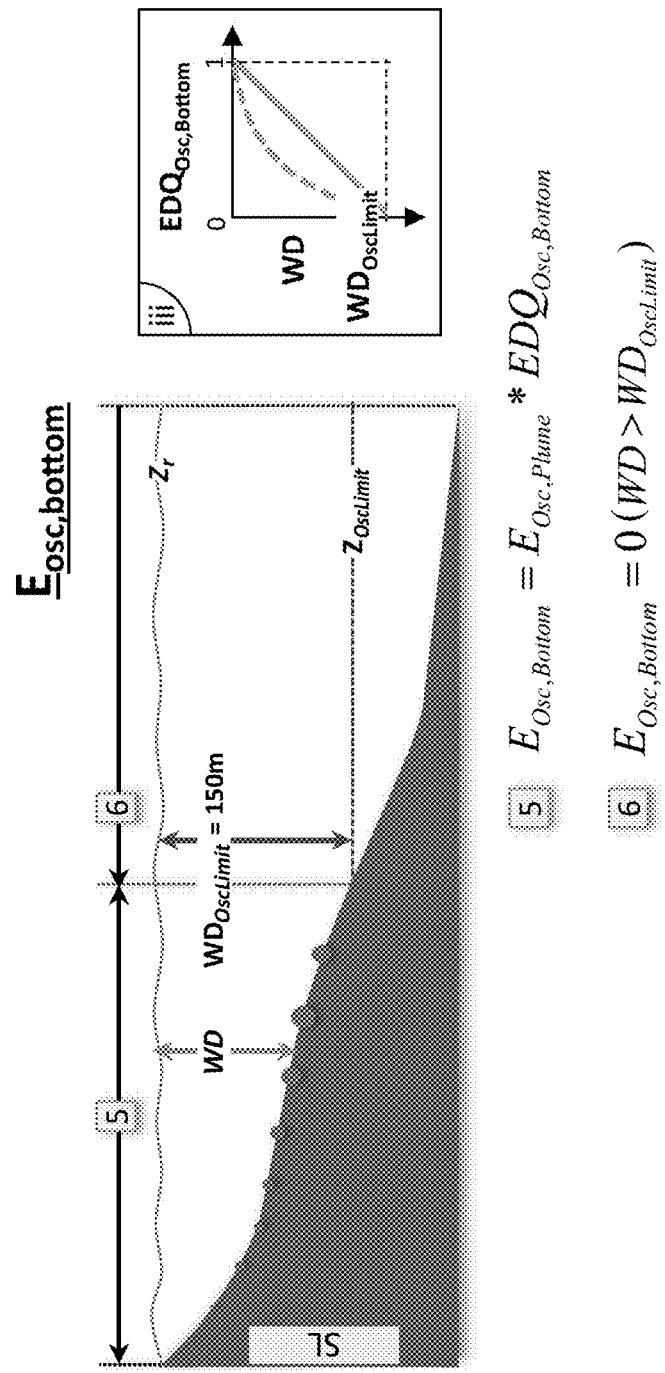

Last, the energy of the oceanic bottom current $E_{osc,bottom}$ is also deduced from the energy of the oceanic plume current $E_{osc,Plume}$ and from a decrease factor $EDQ_{osc,bottom}$ applied to the oceanic plume current energy, the decrease factor being a function of water depth $WD_{bottom}$ such that it is equal to 1 at a water depth of 0, and decreases to 0 at a water depth equal to the water depth of ocean surface current limit $WD_{osc,limit}$. The decrease can be linear or exponential as shown in insert iii) of FIG. 9d.

$$E_{osc,bottom} = \begin{cases} E_{osc,Plume} * EDQ_{osc,bottom} & \text{if } 0 \leq WD_{bottom} \leq WD_{osclimit} \\ 0 & \text{if } WD_{bottom} > WD_{osclimit} \end{cases}$$

The water depth $WD_{bottom}$ used to compute the decrease factor is the water depth WD assigned to the cell.

Device for Implementing the Method

Figure 10:
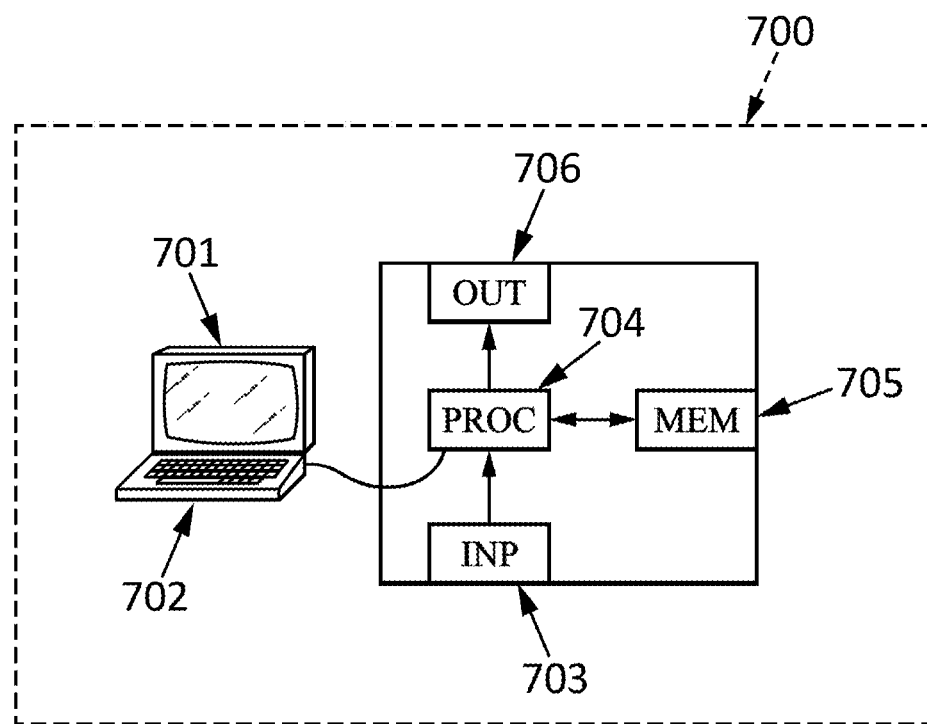
FIG. 10 is a possible embodiment for a device that enables the present invention.

FIG. 10 is a possible embodiment for a device that enables the present invention. In this embodiment, the device 700 comprises a computer, this computer comprising a memory 705 to store program instructions loadable into a circuit and adapted to cause circuit 704 to carry out the steps of the present invention when the program instructions are run by the circuit 704.

The memory 705 may also store data and useful information for carrying the steps of the present invention as described above.

The circuit 704 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This computer comprises an input interface 703 for the reception of several data used for the above method according to the invention, for instance the gridded model, some parameters of the topography of the modelled area, some parameters of the modelled currents, etc. This computer also comprises an output interface 706 for outputting the updated geological gridded model.

To ease the interaction with the computer, a screen 701 and a keyboard 702 may be provided and connected to the computer circuit 704.

The invention claimed is:

1. A computer-implemented method for modelling a formation of a sedimentary area and in view of operating a geological reservoir of the sedimentary area, the method comprising:
   simulating an evolution of a geological gridded model of the sedimentary area, comprising a plurality of cells, over a predetermined period of time T, said simulating comprising:
   a. assigning a water depth to each cell of the geological gridded model,
   b. determining, for each cell of the geological gridded model, a direction and velocity of a water current,
   c. introducing a number of particles in the geological gridded model,
   d. transporting each introduced particle in the geological gridded model based on the computed direction and velocity of the water current, and
   e. updating the geological gridded model of the area according to the transport of each introduced particle,
   f. simulating the evolution of the geological gridded model of the sedimentary area according to the updated geological gridded model of the area over the period of time T, and
   g. modelling the formation of the sedimentary area according to the evolution of the geological gridded model to produce a modelled sedimentary area,
   wherein:
   the water current is a tidal current, comprising alternate phases of rising tide current and falling tide current,
   the simulation of the evolution of the geological gridded model over the predetermined period of time T comprises iterating steps a. to e. a number of times equal to 2k where k is an integer superior or equal to 1, where each iteration of steps a. to e. corresponds to simulating the evolution of the geological gridded model over a period of time T/2k,
   each iteration of step b. is performed for one of the rising tide current or falling tide current, and
   two successive iterations of step b. are performed respectively for one and the other of the rising tide current and falling tide current, and
   operating the geological reservoir of the sedimentary area using the modelled sedimentary area.

2. The method according to claim 1, wherein, for each cell, the direction of the rising tide current is opposite the direction of the falling tide current, and the energy of the rising tide current is equal to the energy of the falling tide current.

3. The method according to claim 1, wherein the water depth assigned to each cell is determined based on a reference water level, and determining the direction of the tidal current comprises:
   determining a high tide water level from the reference water level and a tidal range,
   determining a high tide shoreline from the determined high tide water level, and
   setting, in each cell, the direction of the rising tide current and the falling tide current, according to the localization of the cell relative to the high tide shoreline, wherein the direction of the rising tide current is perpendicular and towards the shoreline, and the direction of the falling tide current is perpendicular and away from the shoreline.

4. The method according to claim 1, wherein the tidal current is decomposed into a plurality of sub-currents comprising at least:
   a plume current, located at water surface, and
   a bottom current, located at water bottom,
   and determining the velocity of the tidal current comprises determining a velocity of each sub-current into which the current is decomposed.

5. The method according to claim 4, wherein determining, for each cell, the velocity of the tidal current comprises computing the energy of the plume current and inferring, from the energy of the plume current in the cell, the energy in the cell of all other sub-currents into which the current is decomposed.

6. The method according to claim 5, wherein the water depth assigned to each cell is determined based on a reference water level, and determining the velocity of the tidal current comprises:
   determining a high tide water level from the reference water level and a tidal range, and a water depth of tidal current limit of influence from the tidal range,
   determining a high tide shoreline from the determined high tide water level, and
   computing an energy of the tidal plume current at the cell, the energy of the tidal plume current being a function of the distance of the cell relative to the high tide shoreline, such that the tidal plume current energy increases from zero at the high tide shoreline to its maximum value at a distance from the shore corresponding to a cell height equal to the reference water level, and decreasing from this distance until reaching zero at a distance from the shore corresponding to a water depth, relative to the high tide water level, equal to the water depth of tidal current limit of influence.

7. The method according to claim 6, further comprising inferring an energy of the tidal bottom current at the cell from the energy of the tidal plume current at the cell, the energy of the tidal bottom current being a function of the water depth of the cell, relative to the high tide water level, such that the bottom current energy is equal to the plume current energy at a water depth of zero, and decreases until reaching a value of zero for a water depth of at least the water depth of tidal current limit of influence.

8. A computer program product, comprising code instructions stored in non-transitory computer-readable memory for implementing the method according to claim 1, when it is executed by a processor.

9. A non-transitory computer readable storage medium, having stored thereon a computer program comprising program instructions, the computer program being loadable into a processor and adapted to cause the processor to carry out, when the computer program is run by the processor, the method according to claim 1.

10. A device for modelling the formation of a sedimentary area, the device comprising a processor configured to implement the method according to claim 1.

11. The method according to claim 1, wherein operating the geological reservoir of the sedimentary area comprises recovering oil or gas from the sedimentary area in accordance with the modelled sedimentary area.

* * * * *